(12) United States Patent
Chenevert et al.

(10) Patent No.: US 8,783,352 B2
(45) Date of Patent: Jul. 22, 2014

(54) MAINTAINING SHALE STABILITY BY PORE PLUGGING

(75) Inventors: Martin E. Chenevert, Austin, TX (US); Mukul M. Sharma, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 388 days.

(21) Appl. No.: 12/466,826

(22) Filed: May 15, 2009

(65) Prior Publication Data

US 2009/0314549 A1 Dec. 24, 2009

Related U.S. Application Data

(60) Provisional application No. 61/073,679, filed on Jun. 18, 2008.

(51) Int. Cl.
*E21B 7/00* (2006.01)
*C09K 8/05* (2006.01)
*C09K 8/03* (2006.01)

(52) U.S. Cl.
CPC . *C09K 8/032* (2013.01); *C09K 8/05* (2013.01); *C09K 2208/10* (2013.01); *C09K 2208/12* (2013.01)
USPC .......................................... 166/293; 166/294

(58) Field of Classification Search
USPC ................ 175/65; 166/250.14, 293, 294
See application file for complete search history.

(56) References Cited

U.S. PATENT DOCUMENTS

| | | | | |
|---|---|---|---|---|
| 3,989,630 | A * | 11/1976 | Walker | 507/114 |
| 4,583,299 | A | 4/1986 | Brooks | |
| 4,591,324 | A | 5/1986 | Kubota | |
| 4,689,161 | A | 8/1987 | Blumenthal et al. | |
| 4,988,450 | A * | 1/1991 | Wingrave et al. | 507/118 |
| 5,358,049 | A * | 10/1994 | Hale et al. | 166/293 |
| 5,955,401 | A | 9/1999 | Liao | |
| 6,579,832 | B2 | 6/2003 | Jimenez et al. | |
| 6,586,371 | B1 | 7/2003 | Maroy et al. | |
| 6,823,940 | B2 * | 11/2004 | Reddy et al. | 166/295 |
| 6,910,537 | B2 * | 6/2005 | Brown et al. | 166/294 |
| 7,033,975 | B2 * | 4/2006 | Baran et al. | 507/102 |
| 7,550,413 | B2 | 6/2009 | Huang et al. | |
| 7,559,369 | B2 * | 7/2009 | Roddy et al. | 166/280.2 |
| 7,786,049 | B2 | 8/2010 | Temple et al. | |
| 2004/0204323 | A1 * | 10/2004 | Temple et al. | 507/100 |
| 2007/0105723 | A1 | 5/2007 | Orton et al. | |

FOREIGN PATENT DOCUMENTS

| | | |
|---|---|---|
| EP | 2215179 B1 | 8/2012 |
| WO | 9409250 A1 | 4/1994 |
| WO | 2009079092 A2 | 6/2009 |
| WO | 2009154914 A2 | 12/2009 |

OTHER PUBLICATIONS

C.E. Neuzil and A.M. Provost, Recent Experimental Data May point to a greater role for osmotic pressures in the subsurface, American Geophyxial Union, Received Aug. 17, 2007, Pulblished Mar. 12, 2009.*

(Continued)

*Primary Examiner* — Zakiya W Bates
*Assistant Examiner* — Silvana Runyan
(74) *Attorney, Agent, or Firm* — Chainey P. Singleton; Edwin S. Flores; Chalker Flores, LLP

(57) ABSTRACT

Compositions and methods for improving wellbores stability of a hydrocarbon bearing shale formation using nanoparticles to decrease swelling and plug pore throats.

20 Claims, 16 Drawing Sheets

(56) References Cited

OTHER PUBLICATIONS

International Search Report and Written Opinion for PCT/US2009/044211 dated Dec. 22, 2009.

Osuji, C., "Effect of porosity and permeability on the membrane efficiency of shales," UT Annual Drilling Meeting, 2007. SPE paper No. 116306.

Al-Bazali, T.M., "Experimental study of the membrane behavior of shale during interaction with water-based and oil-based muds," The University of Texas at Austin (May 2005).

Extended European Search Report for EP 09767226.5 dated Oct. 1, 2012.

Abrams, A., "Mud design to minimize rock impairment due to particle invasion", JPT (May 1977) p. 586.

Chenevert, M. E., "Shale control with balanced activity oil continuous muds", SPE AIME, 1969.

State Intellectual Property Office of the People's Republic of China, Second Office Action for Application Serial No. 200980131938.4, dated Dec. 5, 2013, (with translation), 21 pp.

\* cited by examiner

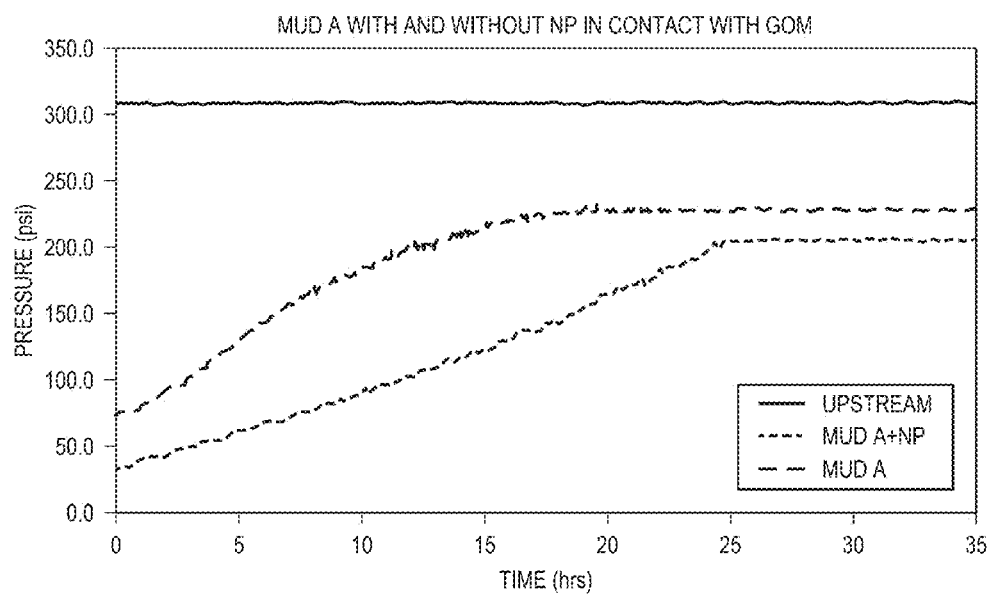
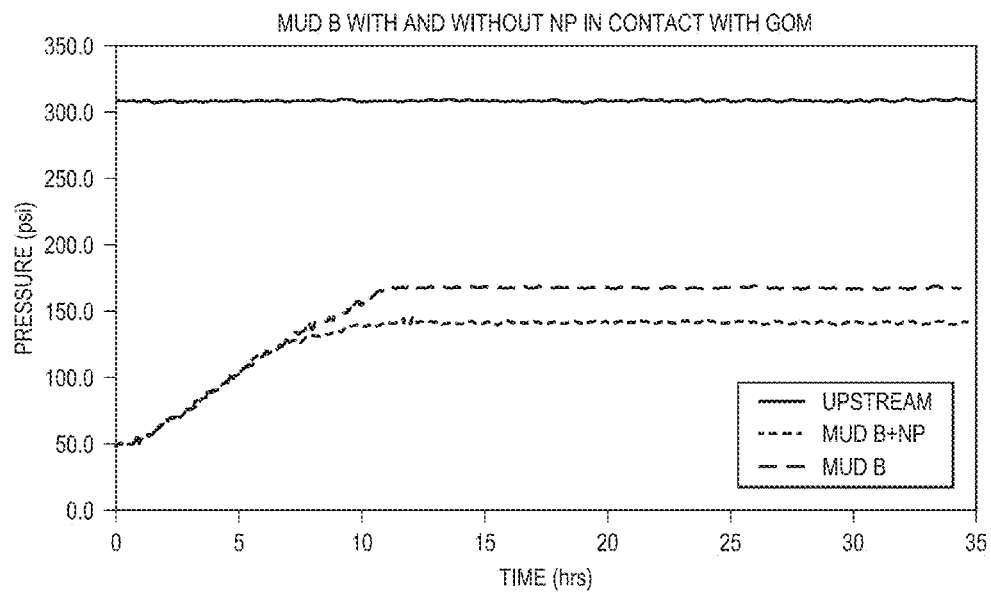

MAINTAINING SHALE STABILITY BY PORE PLUGGING

CROSS-REFERENCE TO RELATED APPLICATIONS

This application claims priority to U.S. Provisional Application Ser. No. 61/073,679, filed Jun. 18, 2008, the entire contents of which are incorporated herein by reference.

TECHNICAL FIELD OF THE INVENTION

The present invention relates in general to the field of shale stability, and more particularly, to compositions and methods for the stabilization of shale at or about the wellbore.

STATEMENT OF FEDERALLY FUNDED RESEARCH

None.

BACKGROUND OF THE INVENTION

Without limiting the scope of the invention, its background is described in connection with drilling shales and shaly sands.

Wellbore stability is one of the most critical aspects of shale drilling and is highly dependent on the drilling fluid. Water invasion into the shale formation weakens the wellbore and causes problems such as hole collapse, stuck pipes etc. The extremely low permeability and low pore throat size of shale is such that normal filtration additives do not form mud cakes and thus do not stop fluid invasion. This research aims to reduce shale permeability by using nanoparticles (NP) to plug pore throats, build an internal and external mud cake and thereby reduce the fluid invasion into the shale.

Recent work (Osuji 2007) has shown that reducing the permeability of shale can enhance its membrane efficiency, thus it is possible that placing nanoparticles in salt-water muds could increase its membrane efficiency.

It is accepted that balanced activity oil-continuous mud (OBM) is a good solution to the shale stability problem since there is no interaction between oil and shale, and the water can be made immobile using ionic solutions. (Chenevert, 1969). However, a solution for water-based mud (WBM) is needed especially in environmentally sensitive areas. Even though there have been many studies that focus on improving the hole stability properties of WBM, no such inhibited mud exists.

SUMMARY OF THE INVENTION

The present invention reduces shale permeability by using nanoparticles to plug pore throats, build an internal and external filter cake and reduce the fluid invasion into the shale. A second objective is to investigate the effect of nanoparticles on the membrane efficiency of a salt water mud.

The present inventors found that pore throat plugging has not been achieved in shale because of the relatively large size of currently used solid mud additives that do not plug nanometer size pore throat openings. Normal solid particles are around 100 times larger than pore throats. The present invention has been used to develop compositions and methods that address various shale properties, nano-particle tests and methods for treating a permeable formation. The composition of fluids, shale type and effects of nanoparticles on filtration are the main aspects that will be observed during our tests.

In one embodiment, the present invention is a method of increasing shale formation stability with a water-based drilling fluid, the method comprising: delivering the water-based drilling fluid to the shale formation, wherein the drilling fluid comprises an aqueous continuous phase; and nanoparticles, wherein the nanoparticles are present in a sufficient weight percent to stabilize the shale formation. In one aspect, the shale comprises Pierre, Arco China, C1, C2, C3, C4, C5, Atoka, Gumbo, Gulf of Mexico (GOM), Pierre, Wolfcamp, Wellington or Mancos. In another aspect, nanoparticles are selected from silica, aluminum, iron, titanium or other metal oxides and hydroxides. In one aspect, the nanoparticles comprise a size range of between a 1 and a 500 nanometer range. In one aspect, the nanoparticles may further comprise a surface active agent. In another aspect, the formation is treated with a slug or pill of a drilling fluid. Examples of surface modifications include but are not limited to alkyl amines, alkyl sulfates, alkyl sulfates containing aromatic rings, alkyl sulfonates, alkyl sulfonates containing aromatic rings (such as alkyl benzene sulfonate), alkyl sulfates and sulfonates containing various proportions of ethylene oxide and propylene oxide groups or polymers such as Polyethylene glycol (PEG), polypropylene glycol (PPG) polymers with molecular weights varying from 500 to 100,000, PEG and PPG polymers functionalized with silane, epoxide, acrylate, alcohol or ether linkages.

In another embodiment, the present invention includes an additive composition for aqueous drilling fluids which imparts improved stability when used in drilling shale formations with an effective quantity of nanoparticles, wherein the nanoparticles decrease swelling and plug pore throats. In one aspect, the shale comprises Pierre, Arco China, C1, C2, C3, C4, C5, Atoka, Gumbo, Gulf of Mexico (GOM), Pierre, Wolfcamp, Wellington or Mancos. In another aspect, nanoparticles are selected from silica, aluminum, iron, titanium or other metal oxides and hydroxides. In one aspect, the nanoparticles comprise a size range of between a 1 and a 500 nanometer range. An aqueous well-drilling fluid containing between about 5 and about 41 weight percent, based on the weight of the aqueous phase, of the additive composition described hereinabove.

In another embodiment, the present invention is an aqueous well-drilling fluid for hydrocarbon bearing shale formation containing between about 1 and about 50 weight percent silica nanoparticles. In another embodiment, the aqueous well-drilling fluid containing between about 10 and about 50 weight percent silica nanoparticles, based on the weight of the aqueous phase. In one aspect, the fluid comprises between 5 and about 45 weight percent silica nanoparticles, based on the weight of the aqueous phase. In yet another aspect, the fluid comprises between 10 and about 29 weight percent silica nanoparticles, based on the weight of the aqueous phase. In one aspect, the shale comprises Pierre, Arco China, C1, C2, C3, C4, C5, Atoka, Gumbo, Gulf of Mexico (GOM), Pierre, Wolfcamp, Wellington or Mancos. In another aspect, nanoparticles are selected from silica, aluminum, iron, titanium or other metal oxides and hydroxides. In one aspect, the nanoparticles comprise a size range of between a 1 and a 500 nanometer range. In one aspect, the nanoparticles comprise a size range of between a 5 and a 20 nanometer range.

Yet another method of the present invention includes a method for drilling effectively through unconsolidated shales which comprises using the aqueous drilling fluid of claim 8 in the drilling operation. Another embodiment of the present invention includes a method for monitoring and improving the stability of a wellbore drilled with a drilling fluid in a shale using a wellbore stability model, the method comprising the steps of: (a) obtaining a preliminary value for weight or one or more chemical properties of said drilling fluid using said wellbore stability model; (b) measuring transient pore pressure response of the formation and at least one of the formation characteristics selected from the group consisting of acoustic, electrical, thermal, and density characteristics; and (c) changing weight percent of silica nanoparticles to decrease swelling and plug pore throats in the shale. In one aspect, the method may also include the step of repeating steps (b) and (c) during drilling of the wellbore. In one aspect, the formation is treated with a slug and/or pill of a drilling fluid that comprises between 5 and 45 weight percent silica nanoparticles, wherein the nanoparticles comprise a size range of between a 1 and a 500 nanometer range. In one aspect, the shale comprises Pierre, Arco China, C1, C2, C3, C4, C5, Atoka, Gumbo, Gulf of Mexico (GOM), Pierre, Wolfcamp, Wellington or Mancos. In another aspect, nanoparticles are selected from silica, aluminum, iron, titanium or other metal oxides and hydroxides. In one aspect, the nanoparticles comprise a size range of between a 1 and a 500 nanometer range. An aqueous well-drilling fluid containing between about 5 and about 41 weight percent, based on the weight of the aqueous phase, any of the additive compositions and well-drilling fluids described hereinabove.

BRIEF DESCRIPTION OF THE DRAWINGS

For a more complete understanding of the features and advantages of the present invention, reference is now made to the detailed description of the invention along with the accompanying figures and in which:

FIG. 23 is a graph that shows a comparison of Mud A with and without NP in contact with GOM shale.

FIG. 24 is a graph that shows a comparison of Mud B with and without NP in contact with GOM shale.

DETAILED DESCRIPTION OF THE INVENTION

Figure 1:
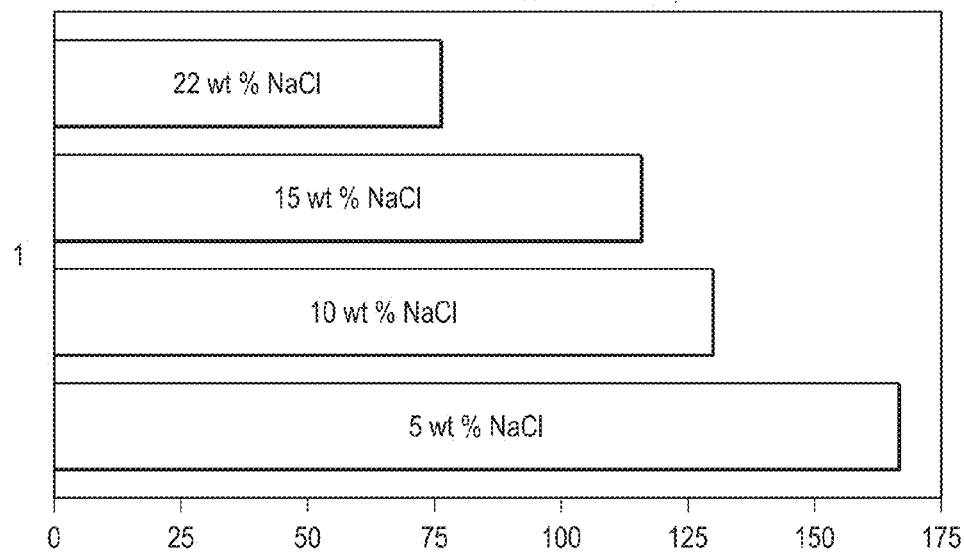
FIG. 1 is a graph that shows temperature stability limits of 5 nm silica nanoparticles.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "nanoparticles" refers to particles of any composition having a effective diameter of 1 to 500 nanometers of any shape and include subcategories such as nanopowders, nanoclusters and nanocrystals. The nanoparticles of the present invention can also be modified by surface modification, e.g., they can be altered chemically, e.g., by attaching surfactants or ligands, organic molecules, surface active materials chemically bonded to the nanoparticles to improve their stability in drilling fluids. One example of a surface modification is imparting a change in the surface charge density of the nanoparticles or improving their shale stabilizing characteristics.

As used herein, the term "surface active agent" refers to agents that modify the surface of nanoparticles, which can be accomplished by adsorption, chemisorption or covalent bonding of surface active materials to the nanoparticle surface to form surface modified nanoparticles. Examples of agents that can be used to surface modify the nanoparticles into surface modified nanoparticles include, for example: alkyl amines, alkyl sulfates, alkyl sulfates containing aromatic rings, alkyl sulfonates, alkyl sulfonates containing aromatic rings (such as alkyl benzene sulfonate), alkyl sulfates and sulfonates containing various proportions of ethylene oxide and propylene oxide groups. Another example of surface active agent(s) include those that lead to the surface modification of nanoparticles (which can also be accomplished by adsorption, chemisorption or covalent bonding) of a polymeric material or materials to the nanoparticle surface. Examples of such materials include, for example: Polyethylene glycol (PEG), polypropylene glycol (PPG) polymers with molecular weights varying from 500 to 100,000, PEG and PPG polymers functionalized with silane, epoxide, acrylate, alcohol or ether linkages.

As used herein, the term "slug" refers to a small volume (usually 500 bbls or less) of drilling fluid that contains the nanoparticles and is positioned or placed in contact with the geologic formation of interest for a period of time.

Shale is a sedimentary rock, which is formed by clays, quartz and other minerals that are found in fine grained rocks. Because of its high clay content, shale tends to absorb water from a WBM which results in swelling and wellbore failure. Shales can me mixed in with sands and these mixtures are referred to as shaly-sands. As Al-Bazali (2006) states, shales which contain smectite or montromorillonite clays can absorb huge amounts of water. Hence shale type and composition play a critical role in wellbore stability problems. The basic properties and compositions of several shales that our research group has studied are listed in Table 1 below.

TABLE 1

Properties of different shale types Al-Bazali (2005)

| PROPERTIES | SHALE TYPE | | | |
|---|---|---|---|---|
| | PIERRE % by weight | ARCO CHINA % by weight | C1 % by weight | ATOKA % by weight |
| Quartz | 19 | 51 | 14 | 52 |
| Total Clay | 64 | 31 | 76 | 33 |
| Chlorite | 4 | 10 | N/A | 7 |
| Kaolinite | 11 | 14 | 39 | 32 |
| Illite | 19 | 44 | N/A | 31 |
| Smectite | 17 | 13 | N/A | 19 |
| Mixed layer | 49 | 20 | N/A | 11 |
| Native water activity | 0.98 | 0.85 | 0.98 | 0.74 |
| Permeability, nd | 6.48 | 0.45 | 2.96 | 0.1 |
| Ave. pore throat size, nm | 31.8 | 20.1 | 25.8 | 9.4 |

The present invention reduces the permeability of shales by plugging their pore throats and thereby build a mudcake. As seen in Table 1, the average pore throat sizes of four types of shales are in the range of 9 to 32 nanometers.

Pore throat size can be determined by using a non-wetting fluid and using the capillary pressure equation (Al-Bazali, 2005). In Equation 1, Pc is the capillary pressure, σ is the interfacial tension between the non-wetting fluid and the water, θ is the contact angle and r is the pore throat radius. Compared to shale pore throat sizes, conventional drilling fluid additives such as bentonite and barite have much larger particle diameters, in the range of 0.1 to 100 micron.

$$Pc = 2 \cdot \sigma \cdot \cos \theta / r$$ Equation 1

Abrams (1977) proposed that in order to form bridging, particle sizes should not be larger than one third of pore throat sizes. This refers to a particle size between 3 to 10 nm for typical shales. It is also stated by Abrams that particles that achieve plugging of the pore throats, should be at least 5% of the total solid particles by volume in the drilling fluid. In conclusion, if the drilling fluid particles that are used are smaller than pore throat sizes, they can invade into the shale, plug the pore throats and thereby built an internal and external mudcake. This would reduce the shale's permeability and slow down, and stop or significantly reduce, water invasion.

Nanoparticles. A particle that has at least one dimension less than 100 nm is called a nanoparticle. Nanotechnology measures and models matter at the scale of 1-100 nm and is mostly applied in optical, electronic and biomedical sciences.

Nanomaterials can be produced in two ways. The first way is to make smaller particles from a bulk material by various chemical or mechanical treatment. A second way is to generate the material from molecular pieces by chemical reactions. The critical considerations in manufacturing are; particle size, shape, composition and size distribution.

The application of nanotechnology in shale stability is a new issue that will be treated in this research study. Modified silica particles which have 5 nm to 20 nm sizes will be used in our tests as an additive to the circulation fluid. Such silica nanoparticle dispersions have been supplied to our laboratory by 3M and have weight percentages as shown in Table 2.

TABLE 2

Properties of Silica Nanoparticle Samples

| Particle Size, nm | Dispersion, by weight |
|---|---|
| 5 | 15.74% solids |
| 5 | 17.71% solids |
| 20 | 41.26% solids |

Since nanoparticles will be used as additives in circulation fluids, three key parameters should be considered; specific gravity, water activity and salt solubility. In order to determine those parameters several experiments were performed.

First, the specific gravity of 5 nm-17.71 weight percent nanoparticle dispersions were determined by measuring the mass and volume of the dispersions using a weight balance. Next, the water activity of the solutions were measured using a hygrometer. The activity of the silica dispersions were found to be like that of pure water ($a_w = 1.0$). Finally, the salt solubility of the nanoparticles was determined by adding NaCl in increments of 5 ml to nanoparticle dispersions and observing the occurrence of precipitation. In this way it was possible to determine the maximum amount of salt that a given silica dispersions can contain. In one test, 1.535 grams of sodium chloride salt was dissolved in a 5 ml solution when the first salt precipitation occurred. This amount of salt is equal to 22 weight % and 0.84 water activity. Table 3 shows the measured properties of the 5 nm 17.71 weight % dispersions, measured at 75 deg F.

TABLE 3

Properties of Silica nanoparticle suspension

| Properties @ 75 deg F. | 5 nm 17.71 Weight % Silica |
|---|---|
| Specific Gravity | 1.09 |
| Water Activity | 1 |
| NaCl Solubility, Weight % | 22 |

Sodium chloride stability tests were performed at various temperatures. As shown in FIG. 1 and Table 4, increasing the NaCl concentration of 17.71% nanoparticle suspensions resulted in precipitation at lower temperatures. It is possible to use other nanoparticles such as silica nanoparticles modified by surfactants, nanoparticles made of aluminum, iron, titanium and other metal oxides and hydroxides. These nanoparticles have been shown to display different suspension stability as a function of temperature and salinity and could be used in place of the silica nanoparticles used here.

TABLE 4

Precipitation temperatures of 17.71 wt % nanoparticle dispersions with different salt concentrations.

| 17.71 wt % 5 nm Silica | Precipitation Temprature, F. |
|---|---|
| 5% NaCl | 165 |
| 10% NaCl | 130 |
| 15% NaCl | 115 |
| 22% NaCl | 75 |

Figure 2:
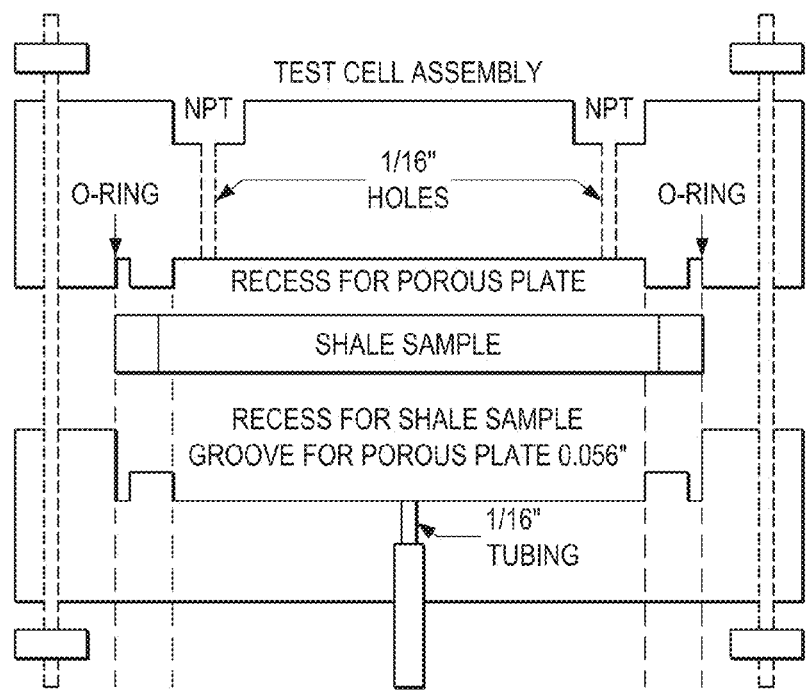
FIG. 2 is a diagram of a test cell.

First, shale-membrane efficiency studies were conducted using the same equipment as outlined by Osuji, 2007. The equipment consists of a stainless steel test cell, reservoir cylinder and flow lines, pressure transducers, manual pump for bottom pressure, and a syringe injection pump for upstream pressure, nitrogen cylinder and pressure recorder. As shown in FIG. 2, the cell has one top sealing chamber, which has inlet and outlet flow channels and a bottom chamber which has one flow channel. These parts are assembled together using locking bolts and with two O rings that seal both sides. A pressurized syringe pump regulates the flow rate of the fluid from the reservoir cylinder to the upstream chamber. A nitrogen gas cylinder provides the pressure needed for the upper chamber flow and a manual pump provides a hydraulic pressure to the bottom of the cell. Pressure transducers connected to the top and bottom lines send signals to the pressure recorders.

During testing, a shale sample disk is located between top and bottom chambers. The top of the sample is exposed to fluid flow under a fixed flow rate and pressure. Pressure differences in the bottom and top chambers at the end of the test are used to obtain permeability properties.

Figure 3:
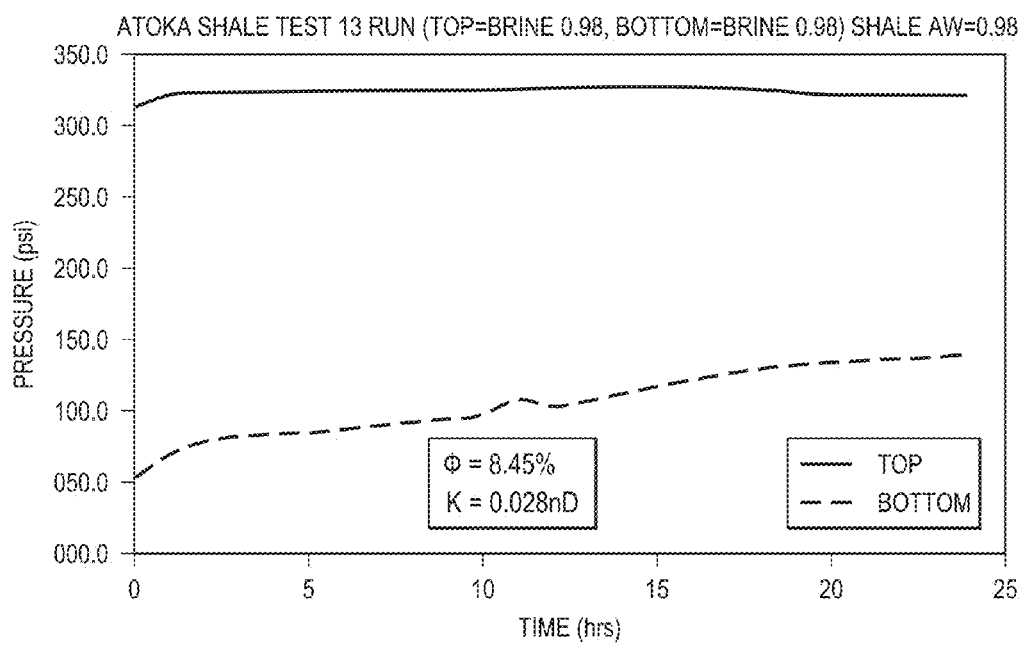
FIG. 3 is a graph with results of Atoka shale in contact with 0.98 activity brine.
Figure 4:
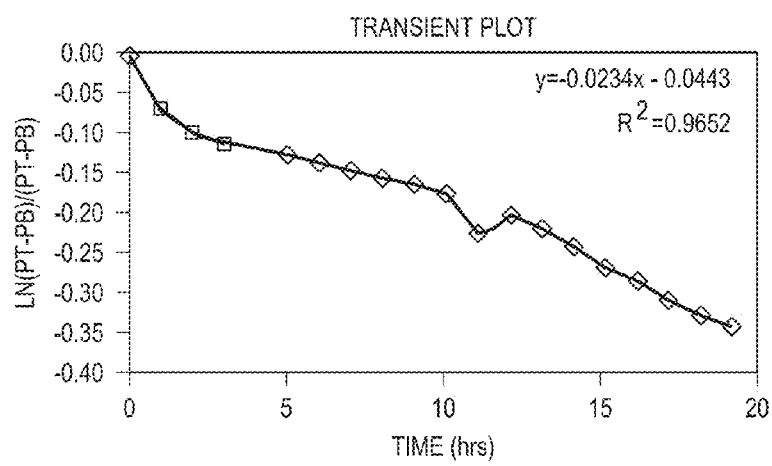
FIG. 4 is a graph that shows a transient plot of upstream and downstream pressures in the shale test cell.
Figure 6:
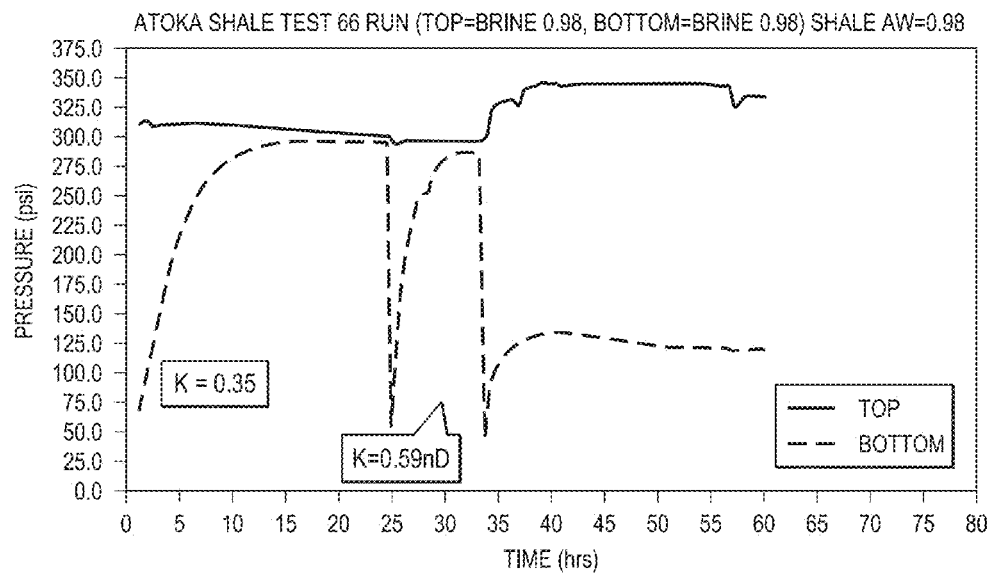
FIG. 6 is graph that shows the result from a three step test with Atoka shale.

Results obtained for the first test are shown in FIG. 3. In this test a brine solutions was used whose composition is given above FIG. 3. The dashed line shows the bottom pressure, which began at 50 psi and built up 140 psi by the end of the test. Bottom pressure increases was caused by fluid and ion flow through the shale sample. Equation 2 and the slope of the first 23 hours of the pressure—time plot are used to determine the permeability, as shown in FIG. 6. This same type of test will be run with a nanoparticle saline dispersion and results will be compared.

Permeability Calculation:

$$k=(-m \cdot \mu \cdot C \cdot V \cdot h)/(A) \text{(Al-Bazali 2005)} \quad \text{Equation 2}$$

where;
k: Permeability ($cm^2$)
m: Slope of the linear portion of curve in FIG. 5.
μ: Viscosity (psi·second)
C: Compressibility, $psi^{-1}$
V: Volume ($cm^3$)
A: Area, $cm^2$ (Surface area of the shale sample exposed to the upstream flow)

There is very little information on the use of nanoparticles in drilling fluids. Particles were studied to determine their ability to pass through low permeability materials. The first study performed used granite and it was found that nanoparticles could easily pass through the sample of granite.

Next, it was determined whether a 1.3 nDarcy mud cake could be plugged with nano particles. Using past filtration data as a guide (Dewan and Chenevert, 2001), this cake was made using a mud that contained 10 ppb bentonite and 1 ppb CMC. Again, the nanoparticles easily passed through the mud cake.

It was found that in a sodium chloride stability test 17.71 wt % nanoparticle dispersions maintain stability to 115° F.

Example 2

Atoka Shale

The Atoka Shale was selected for study using nanoparticles. As part of the standard procedure, samples of the Atoka share were placed in the 0.98 relative humidity desiccator, so as to fix their water activity before testing. While awaiting shale equilibrium, a third study was performed using two, 1 inch by ½ inch by ½ inch, pieces of C3 shale and a Swell Meter. In these tests, one sample was immersed in water and the second sample was immersed in a 41 wt % dispersion of 20 nm particles.

Figure 5:
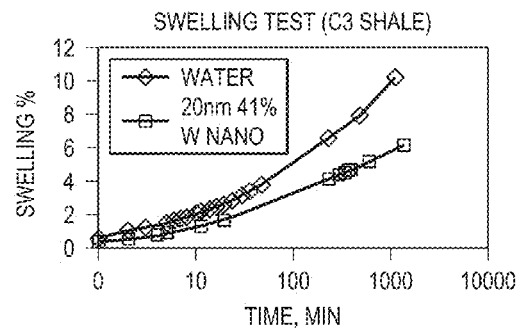
FIG. 5 shows a C3 shale swelling test performed with fresh water and nanoparticle dispersion.

As shown in FIG. 5, after about 18 hours, the C3 shale that was immersed in the water had experienced about 10.8% swelling and the nanoparticle dispersion experienced only 6.4% swelling, a 41% reduction. These results are the first time swelling was reduced in a shale by a simple water plus solids dispersion.

Using the test cell as depicted in FIG. 2, and using the samples of Atoka shale that had been equilibrated, two tests were run. In the next test (FIG. 6), a three-step procedure was followed. First, the sample was subjected to a low salinity brine (sea water) and it easily penetrated the shale completely in about 25 hours. The bottom pressure of the shale was then reduced in step 2 and again the sea water easily penetrated the shale (see 25 to 34 hours of FIG. 6). In the third step, the top of the shale was subjected to the nanoparticle dispersion and complete shale plugging occurred in only 5 hours (see 34 to 39 hours). Again, it was found that nanoparticles can reduce flow into a shale.

Figure 7:
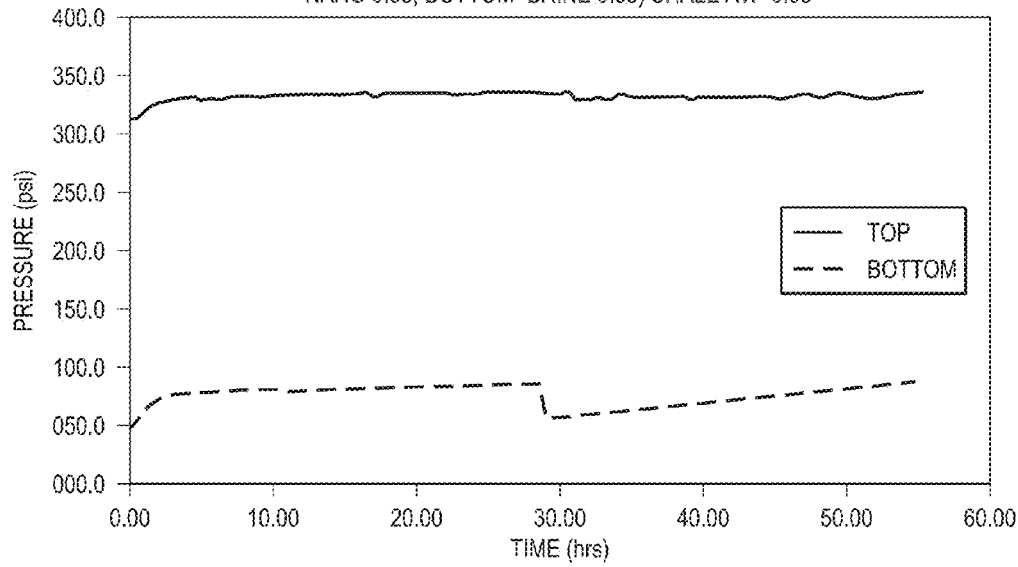
FIG. 7 is a graph of a two-step test with and without nanoparticles.

In another test, a two-step procedure was followed to see if a high concentration of nanoparticles (41 wt %) would completely plug the pore throats. In the first step of FIG. 7 (0 to 28 hours) the nanoparticle dispersion was used, and plugging was achieved in about two hours. In the second step, the nanoparticle dispersion was removed and sea water was flowed across the top of the shale. As shown it did not penetrate the shale. This shows that the nanoparticles had permanently plugged the shale.

Figure 8:
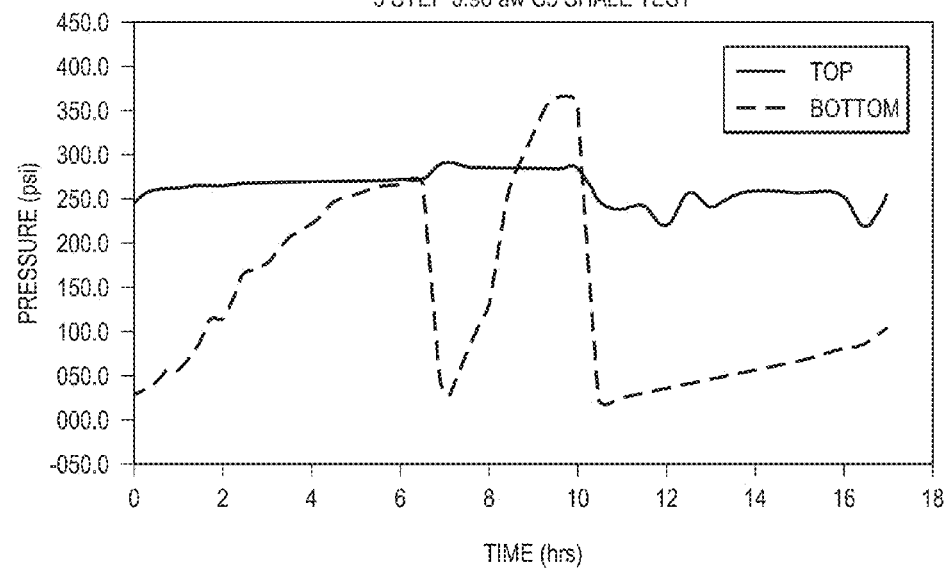
FIG. 8 is a graph of a three-step test with C5 shale without and with nanoparticles

Another test was performed to see how nanoparticles would work for another type of shale, namely the C5. The test consisted of 3 steps as seen in FIG. 8. In the first step (0 to 7 hours), a negative osmotic pressure was applied to the sample using a lower water activity brine (aw=0.85). The bottom pressure built up to the top pressure in 6 hours. The second step used a sea water dispersion which had the same water activity (0.98 Aw) as the shale sample and the bottom fluid. The bottom pressure built up to the top pressure and beyond in 3 hours. In the third step, 20 nm 41 w % nanoparticle dispersion was used as the top fluid and partial plugging was achieved (10-17 hours).

Figure 9:
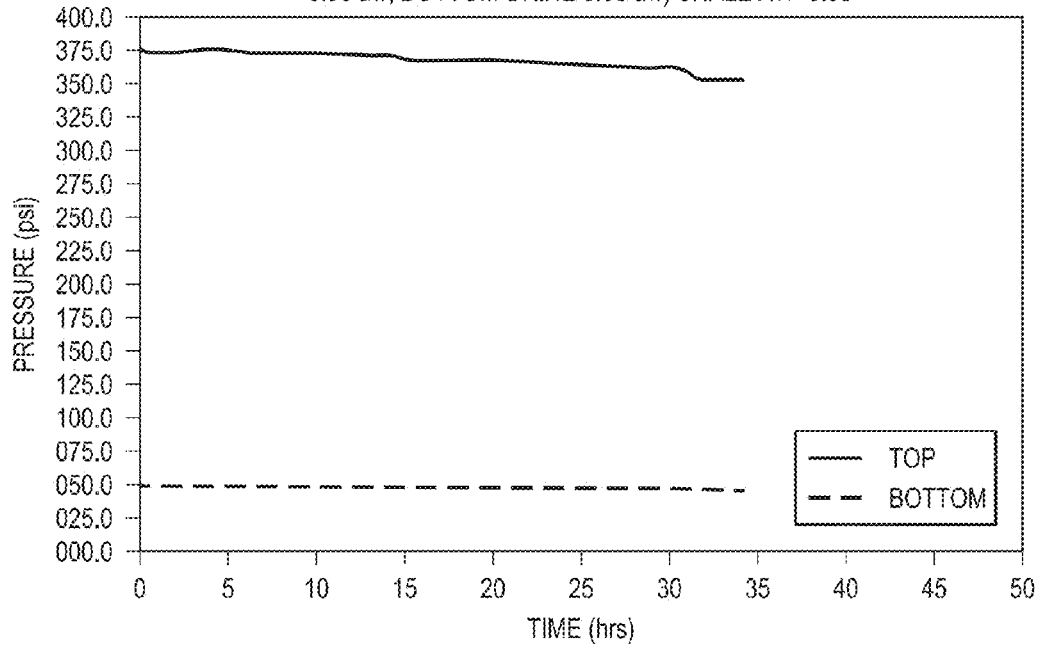
FIG. 9 is a graph that shows the results of the test with a 29 wt. % silica nanoparticle dispersion.

Another test was performed to investigate the effect of a lower concentration of nanoparticles. In this test a sample of Atoka shale was contacted with a 29 w %, 20 nm nanoparticle dispersion. As seen in FIG. 9, the bottom pressure did not build up at all. Complete plugging was achieved.

Figure 10:
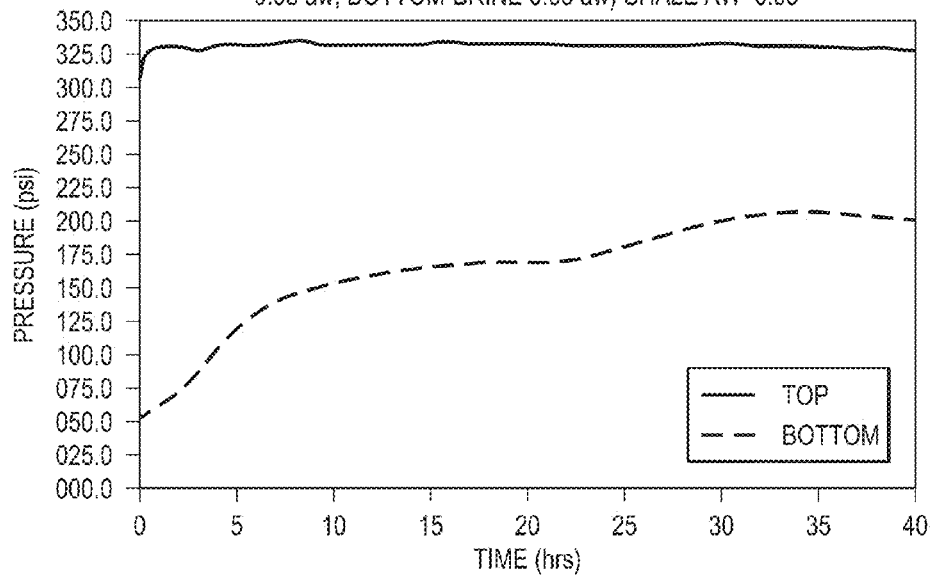
FIG. 10 is a graph that shows the results of a test performed with a 5 wt. % nanoparticle dispersion.

Another test was performed under the same conditions as the seventh test except a lower weight percentage dispersion (i.e., 5%) of nanoparticles was used. As shown in FIG. 10 it took 33 hours before complete plugging occurred.

Figure 11:
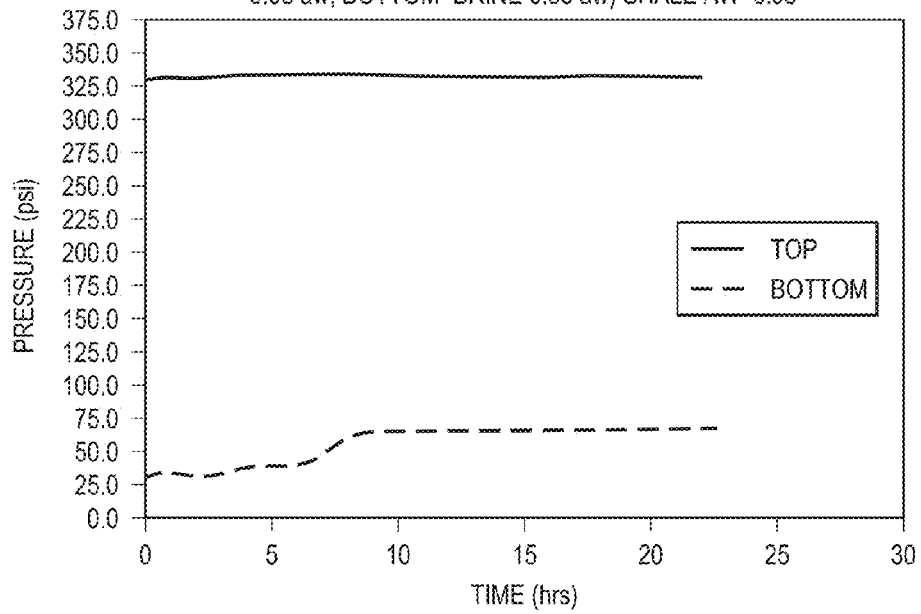
FIG. 11 is a graph that shows the results of a test performed with 10 wt. % nanoparticle dispersion.
Figure 12:
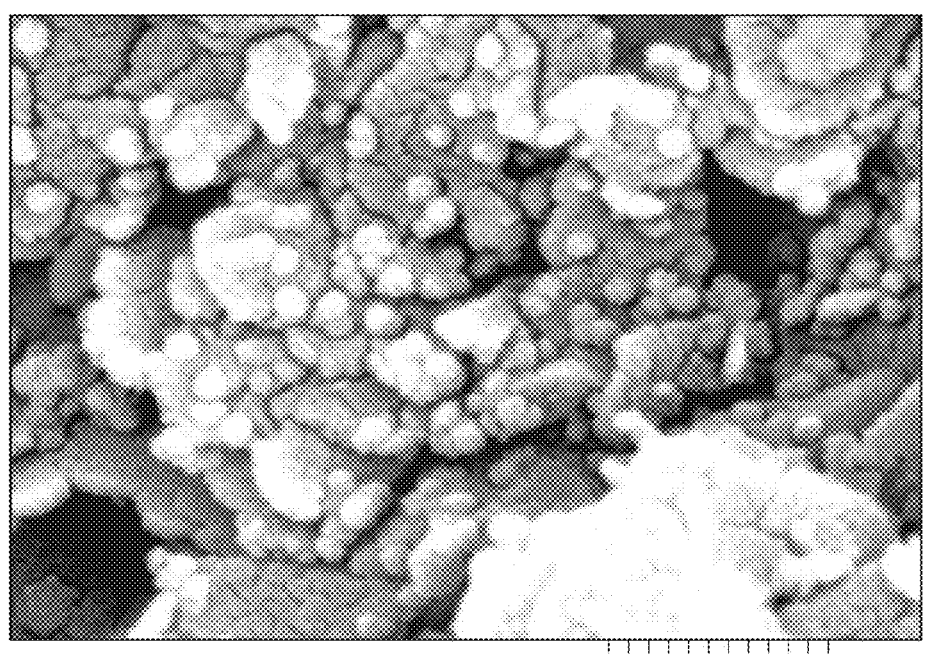
FIG. 12 is a scanning electron micrograph of 20 nm particles on Atoka shale (dotted scale is 375 nm)

Another test was performed under the same conditions as the prior test except that a 10 wt % dispersion of nanoparticles were used. As shown in FIG. 11 complete plugging occurred in about 8 hours.

The next study consisted of using a Scanning Electron Microscope so as to visualize the type of plugging that was taking place. Photos 12 to 14 were obtained using an Atoka shale sample that had been tested with a 20 nm 29 w % silica nanoparticle dispersion.

Figure 13:
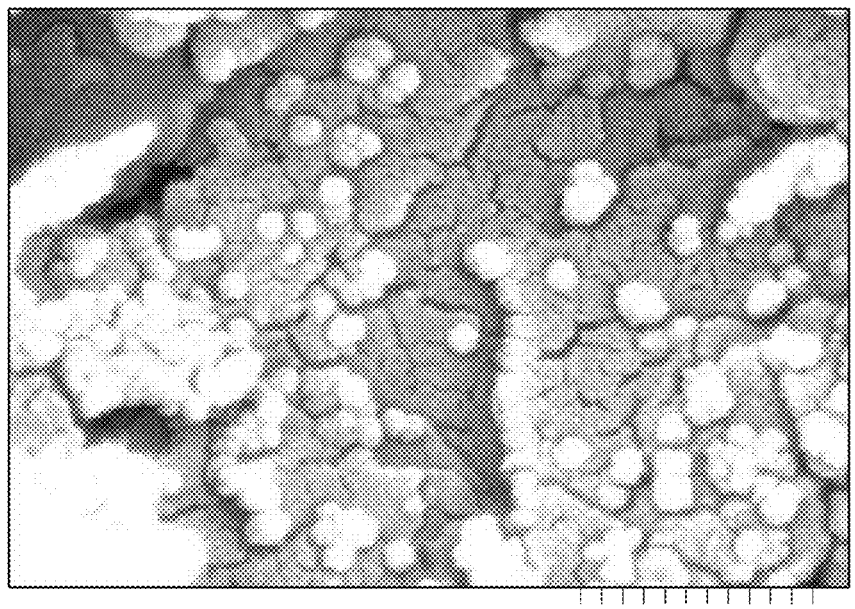
FIG. 13 is a scanning electron micrograph of a 20 nm Silica nanoparticles in different scale.
Figure 14:
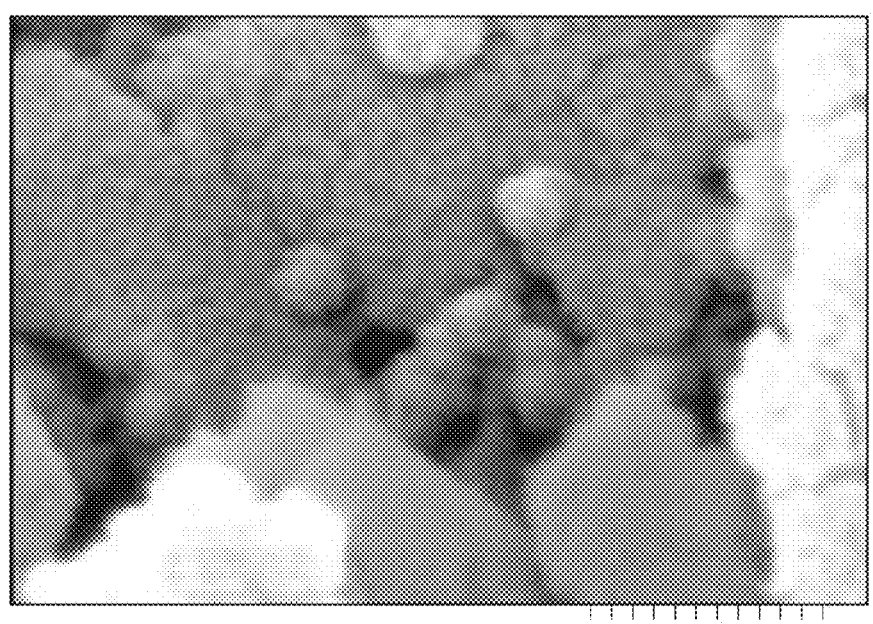
FIG. 14 is a photograph scanning electron micrograph of a group of particles plugged a pore throat.
Figure 15:
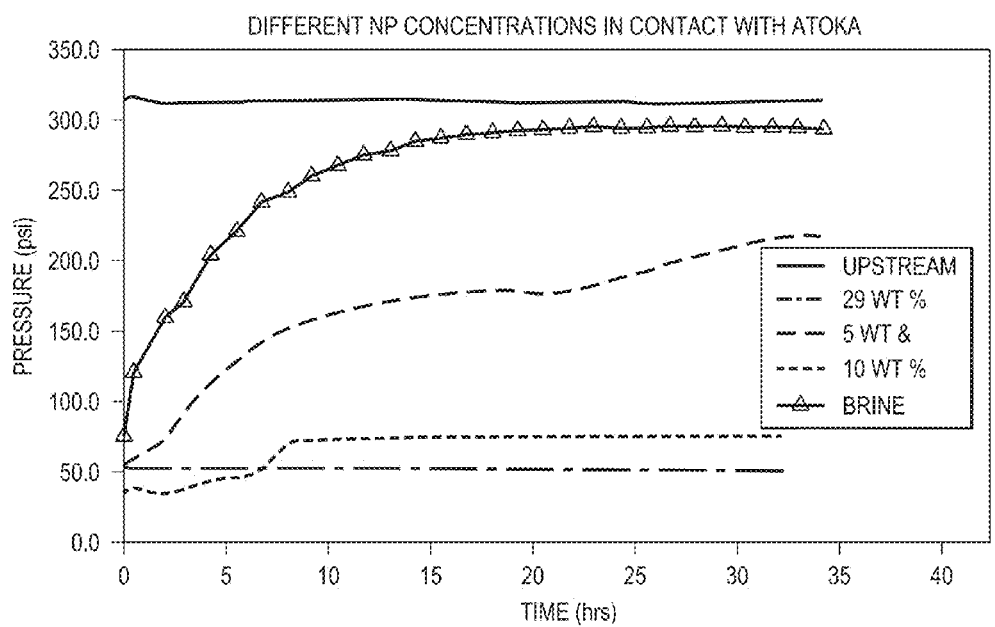
FIG. 15 is a graph that shows the test results with different concentrations of nanoparticles in contact with Atoka shale.

In FIGS. 13 and 14, it is seen that the Atoka shale has a wide range of pore throats and 20 nm particles plugged the ones that fit that size. This result suggests that if a nanoparticle mixture that includes different sized particles between 5-50 nm, more pores could be plugged.

It is easily seen in the center of FIG. 14 that nanoparticles can group together and plug a single large pore throat.

Figure 16:
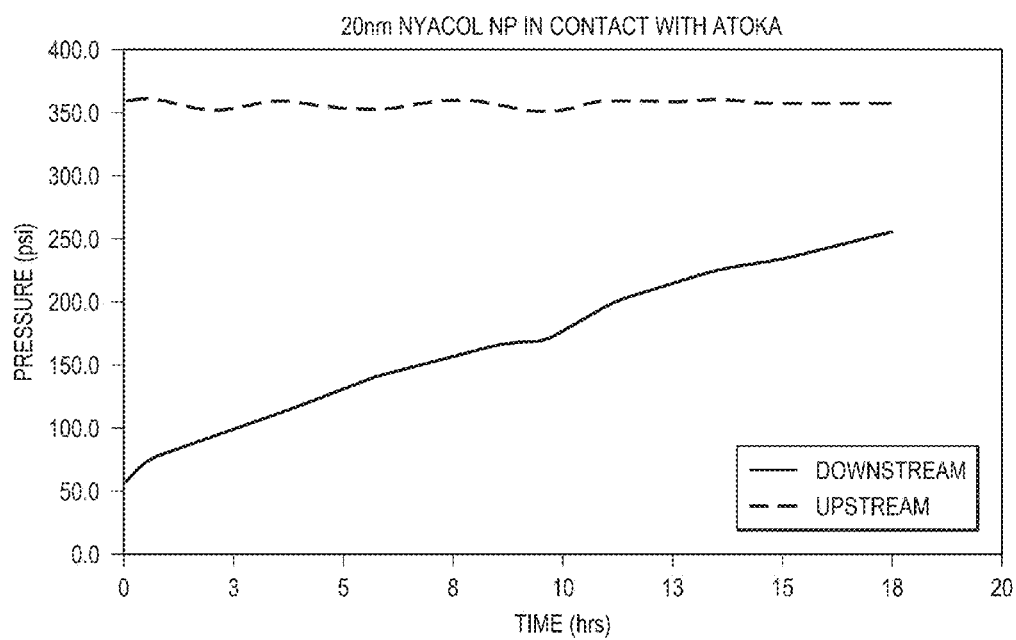
FIG. 16 is a graph of the results of test performed with a Nyacol 40 wt % 20 nm dispersion.

FIG. 16 shows tests with different concentrations of nanoparticles in contact with Atoka shale. As shows in FIG. 16, silica nanoparticles (3M Minneapolis, Minn.) reduce the fluid invasion into the shale compared to the brine. Another conclusion is that the minimum concentration required to reduce the fluid penetration is 10 wt % NP, using the following test conditions:

TABLE 5

20 nm 10 wt % test in contact with Atoka shale.

| Shale | Atoka |
|---|---|
| Brand | 3M |
| Top Fluid | NP |
| NP wt % | 10 |
| NP Size (nm) | 20 |
| Bottom Fluid | Brine |
| Aw top | 0.98 |
| Aw Bottom | 0.98 |
| Aw shale | 0.98 |
| Top Pres. (Psi) | 325 |
| Bottom Pres. (Psi) | 40 |

Example 3

Nanoparticle Type and Size Tests

Tests were performed to investigate the effect of the Nyacol's 20 nm particles in contact with Atoka shale. This test was a straight application of 20 nm Nyacol's silica NP dispersion. In this test a sample of Atoka shale was exposed to a 40 wt %, 20 nm NP dispersion. Table 6 summarizes the test condition. As seen in FIG. 16, the bottom pressure built up in 17 hours at about 12 psi/hour, which is considered high. Nyacol's 20 nm particles did not plug the pores as well as 20 nm particles.

TABLE 6

Test Conditions using a 40 wt %, 20 nm NP dispersion

| Shale | Atoka |
|---|---|
| Brand | Nyacol |
| Top Fluid | NP |
| NP wt % | 41 |
| NP Size (nm) | 20 |
| Bottom Fluid | Brine |
| Aw top | 1 |
| Aw Bottom | 0.98 |
| Aw shale | 0.98 |

Figure 17:
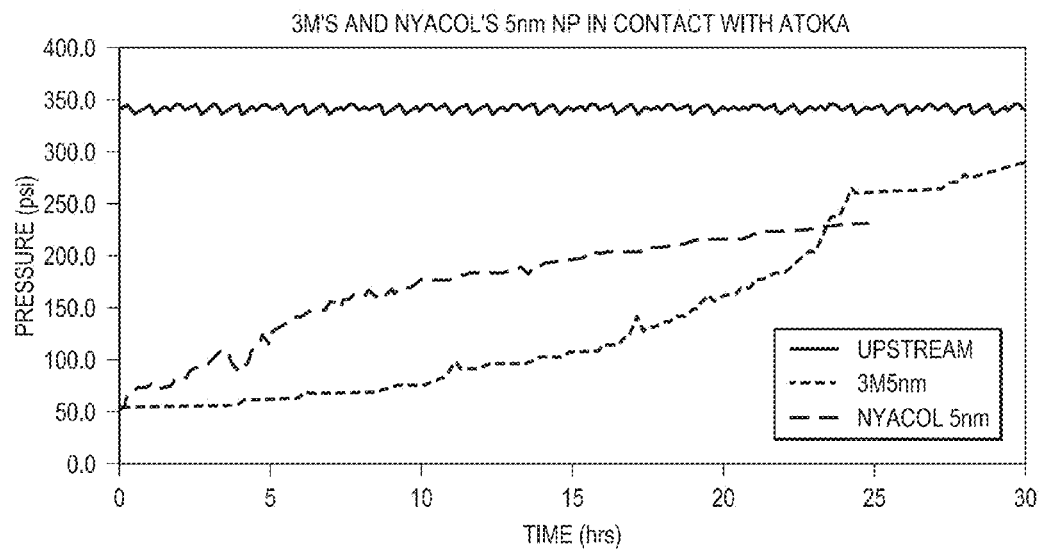
FIG. 17 is a graph that compares 17 wt % and Nyacol's 15 wt % 5 nm dispersions in contact with Atoka.

Next, tests were performed to investigate the effect of 5 nm particles in contact with Atoka shale (manufactured by Nyacol and 3M). The 3M and Nyacol 17 wt % and 15 wt %, 5 nm NP dispersions flowed across the surface of the Atoka shale sample. Test conditions are summarized in Table 7. As seen in FIG. 17, the bottom pressure built up to top pressure in 25 hours. 5 nm particles did not plug the pores as much as 20 nm particles.

TABLE 7

Test Conditions using 17 wt % and 15 wt %, 5 nm NP dispersions.

| Shale | Atoka | Atoka |
|---|---|---|
| Brand | Nyacol | 3M |
| Top Fluid | NP | NP |
| NP wt % | 15 | 17.71 |
| NP Size (nm) | 5 | 5 |
| Bottom Fluid | Brine | Brine |
| Aw top | 0.98 | 0.98 |
| Aw Bottom | 0.98 | 0.98 |
| Aw shale | 0.98 | 0.98 |
| Top Pres. (Psi) | 340 | 340 |
| Bottom Pres. (Psi) | 55 | 55 |

Example 4

Field Mud Tests

Field Muds in contact with Atoka shale. Tests were performed to observe the performance of Mud A. Table 8 gives the test conditions. The bottom pressure stabilized at 60 psi differential pressure in 25 hours. Using the transient method discussed hereinabove, the permeability of the sample was determined to be 0.044 nd. The pressure drop of 15 psi in the last 8 hours of this test may be the result of temporary temperature change in the laboratory.

TABLE 8

Field Muds in contact with Atoka shale

| Top Fluid | Mud A |
|---|---|
| NP wt % | 0 |
| Bottom Fluid | Brine |
| Aw top | 1 |
| Aw Bottom | 0.98 |
| Aw shale | 0.98 |
| Top Pres. (Psi) | 290 |
| Bottom Pres. (Psi) | 50 |
| Result | Stabilized at 60 psi differential pressure in 25 hours with a permeability of 0.044 nd. |

TABLE 9

Field Mud Properties.

| Mud Properties | Mud A | Mud B | Mud C | Mud D |
|---|---|---|---|---|
| Density, lb/gal | 12 | 11.6 | 9.3 | 9.8 |
| PV @ 80 F., cP | 18 | 20 | 28 | 11 |
| YP @ 80 F., lb/100 ft2 | 4 | 11 | 36 | 9 |
| Solids Content, % by Volume | 19.5 | 18.5 | 18.5 | 11 |
| Water Content, % by Volume | 77 | 79 | 79 | 88 |
| Other Content, % by Volume | 3.5 | 2.5 | 2.5 | 1 |
| MBT, ppb Bentonite eq. | 42.5 | 40 | 3.5 | 26.25 |
| pH | 8.7 | 11.4 | 9.4 | 11.4 |
| Chlorides, mg/L | 1900 | 65000 | 28000 | 320 |
| LignoSulfonate Concentration, lb/bbl | 100 | | | |
| Water activity | 1 | 0.93 | 0.98 | 1 |

Figure 18:
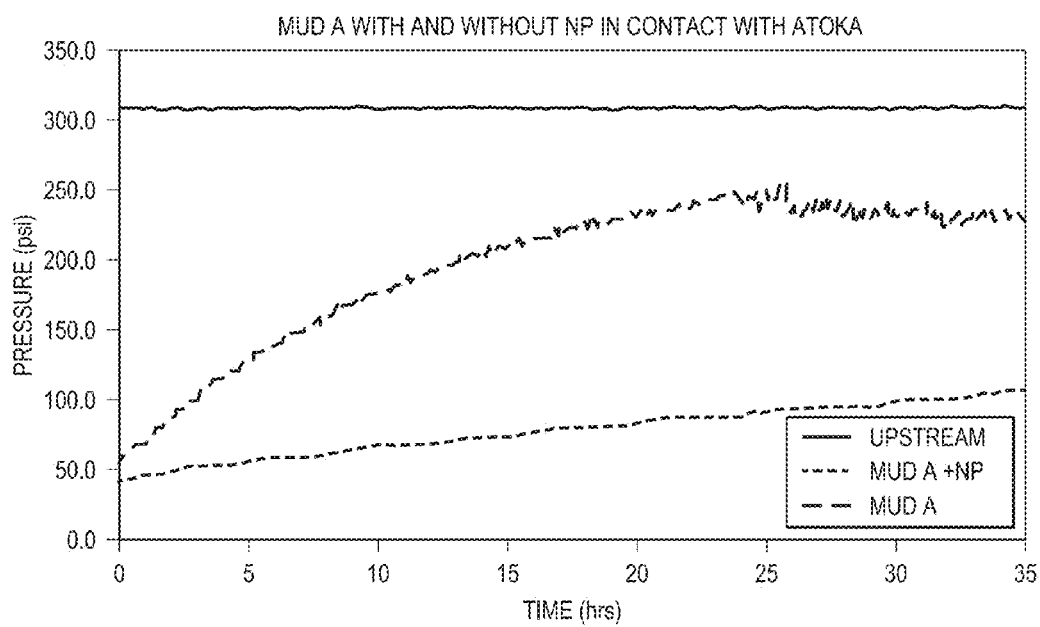
FIG. 18 is a graph that shows a comparison of Mud A with and without NP in contact with Atoka shale.

Next, a test was performed to observe the effect of the Nyacol nanoparticle dispersion on the performance of Mud A. Mud A, which was modified with 10 wt % Nyacol NP, was flowed across the Atoka shale sample. Table 10 shows the test conditions and Table 11 shows the mud composition. The bottom pressure stabilized at 170 psi differential pressure in 35 hours. As shown in FIG. 18, adding Nyacol's silica NP dispersion to the Field Mud A reduced the fluid penetration by 72% in 36 hours. Using the transient method discussed in Chapter 4 the permeability of the sample was determined to be 0.0038 nd.

TABLE 10

Test conditions.

| | |
|---|---|
| Shale | Atoka |
| Brand | Nyacol 9711 |
| Top Fluid | Mud A + NP |
| NP wt % | 10 |
| NP Size (nm) | 20 |
| Bottom Fluid | Brine |
| Aw top | 1 |
| Aw Bottom | 0.98 |
| Aw shale | 0.98 |
| Top Pres. (Psi) | 290 |
| Bottom Pres. (Psi) | 50 |
| Result | Maintained 170 psi differential pressure for 35 hours with a permeability of 0.0038 nd. |

TABLE 11

Mud composition.

| Mud A + NP | Volume, cc | Mass, gr |
|---|---|---|
| Mud solid | 17.33 | 56.44 |
| mud water | 71.56 | 71.56 |
| mud total | 88.89 | 128.00 |
| NP solid | 10.13 | 16.80 |
| NP sol. water | 23.20 | 23.20 |
| NP sol. total | 33.33 | 40.00 |
| Total Solid % | 22.5% | 43.6% |
| NP % | 8.3% | 10.0% |

Next, a test was performed to observe the response of Mud B in contact with Atoka shale. Table 12 shows the test conditions. The bottom pressure stabilized at 180 psi differential pressure in 30 hours. Using the transient method hereinabove, the permeability of the sample was determined to be 0.0047 nd.

TABLE 12

Test conditions.

Figure 19:
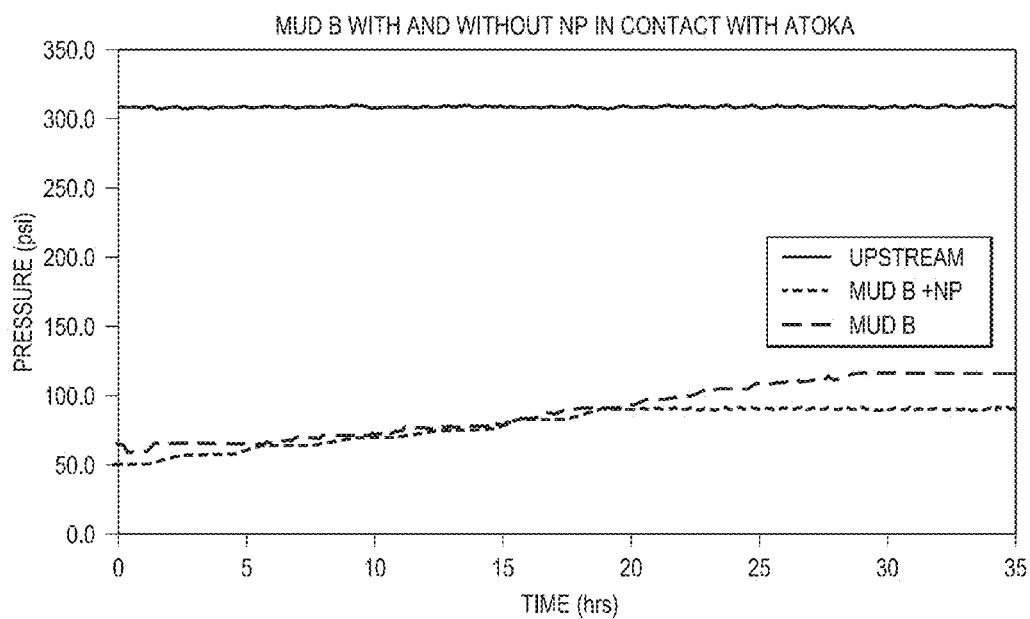
FIG. 19 is a graph that shows a comparison of Mud B with and without NP in contact with Atoka shale.

| | |
|---|---|
| Top Fluid | Mud B |
| NP wt % | 0 |
| Bottom Fluid | Brine |
| Aw top | 0.93 |
| Aw Bottom | 0.98 |
| Aw shale | 0.98 |
| Top Pres. (Psi) | 330 |
| Bottom Pres. (Psi) | 70 |
| Result | Stabilized at 200 psi differential pressure in 30 hours with a permeability of 0.0047 nd. | was performed to observe the effect of the Nyacol nanoparticle dispersion on the response of Mud B in contact with Atoka shale. Table 13 shows the test conditions and Table 14 shows the mud composition. Mud B, which was modified with 10 wt % Nyacol NP, was flowed across the Atoka shale sample. The bottom pressure stabilized at 210 psi differential pressure in 20 hours. As shown in FIG. 19, adding Nyacol's silica NP dispersion to the Field Mud B reduced the fluid penetration by 16% in 36 hours. Using the transient method for permeability of the sample, which was determined to be 0.0058 nd.

TABLE 13

Test conditions.

| | |
|---|---|
| Shale | Atoka |
| Brand | Nyacol 9711 |
| Top Fluid | Mud B + NP |
| NP wt % | 10 |
| NP Size (nm) | 20 |
| Bottom Fluid | Brine |
| Aw top | 0.93 |
| Aw Bottom | 0.98 |
| Aw shale | 0.98 |
| Top Pres. (Psi) | 340 |
| Bottom Pres. (Psi) | 50 |
| Result | Stabilized at 240 psi differential pressure in 20 hours with a permeability of 0.0058 nd. |

TABLE 14

Composition

| Mud B + Nyacol NP | Volume, cc | Mass, gr |
|---|---|---|
| Mud solid | 17.94 | 48.97 |
| mud water | 79.03 | 79.03 |
| mud total | 96.97 | 128.00 |
| NP solid | 10.13 | 16.80 |
| NP sol. water | 23.20 | 23.20 |
| NP sol. Total | 33.33 | 40.00 |
| Total Solid % | 21.5% | 39.1% |
| NP % | 7.8% | 10.0% |

Another test was performed to observe the response of Mud C in contact with Atoka shale. Table 15 shows the test conditions. The bottom pressure stabilized at 70 psi differential pressure in 32 hours. Using the transient method the permeability of the sample was determined to be 0.028 nd.

TABLE 15

Test conditions.

| | |
|---|---|
| Shale | Atoka |
| Top Fluid | Mud C |
| NP wt % | 0 |
| Bottom Fluid | Brine |
| Aw top | 0.98 |
| Aw Bottom | 0.98 |
| Aw shale | 0.98 |
| Top Pres. (Psi) | 340 |
| Bottom Pres. (Psi) | 50 |
| Result | Stabilized at 80 psi differential pressure in 30 hours with a permeability of 0.028 nd. |

Figure 20:
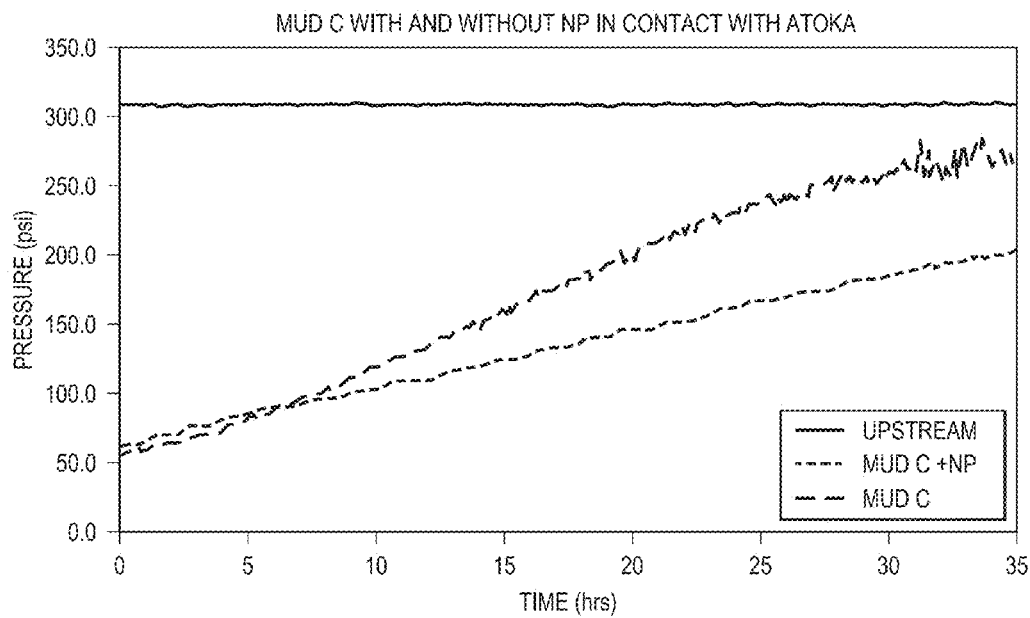
FIG. 20 is a graph that shows a comparison of Mud C with and without nanoparticles in contact with Atoka shale.

Yet another test was performed to observe the effect of NP's on the response of Mud C in contact with Atoka shale. Table 16 and Table 17 show the test conditions. The bottom pressure stabilized at 120 psi differential pressure in 40 hours. As shown in FIG. 20, adding Nyacol's silica NP dispersion to the Field Mud C reduced the fluid penetration by 38% in 36 hours. Using the transient method the permeability of the sample was determined to be 0.0114 nd.

TABLE 16

Test Conditions

| | |
|---|---|
| Shale | Atoka |
| Brand | Nyacol 9711 |
| Top Fluid | Mud C + NP |
| NP wt % | 10 |
| NP Size (nm) | 20 |
| Bottom Fluid | Brine |
| Aw top | 0.98 |
| Aw Bottom | 0.98 |
| Aw shale | 0.98 |
| Top Pres. (Psi) | 335 |
| Bottom Pres. (Psi) | 55 |
| Result | Stabilized at 120 psi differential pressure in 40 hours with a permeability of 0.0114 nd. |

TABLE 17

Composition

| Mud C + Nyacol NP | Volume, cc | Mass, gr |
|---|---|---|
| Mud solid | 21.14 | 34.86 |
| mud water | 93.14 | 93.14 |
| mud total | 114.29 | 128.00 |
| NP solid | 10.13 | 16.80 |
| NP sol. water | 23.20 | 23.20 |
| NP sol. total | 33.33 | 40.00 |
| Total Solid % | 21.2% | 30.7% |
| NP % | 6.9% | 10.0% |

Another test was performed to observe the response of Mud D in contact with Atoka shale. Table 18 shows the test conditions. The bottom pressure stabilized at 150 psi differential pressure in 40 hours. Using the transient method the permeability of the sample was determined to be 0.0056 nd.

TABLE 18

Test Conditions.

| | |
|---|---|
| Shale | Atoka |
| Top Fluid | Mud D |
| NP wt % | 0 |
| Bottom Fluid | Brine |
| Aw top | 1 |
| Aw Bottom | 0.98 |
| Aw shale | 0.98 |
| Top Pres. (Psi) | 305 |
| Bottom Pres. (Psi) | 55 |
| Result | Stabilized at 150 psi differential pressure in 40 hours with a permeability of 0.0056 nd. |

Figure 21:
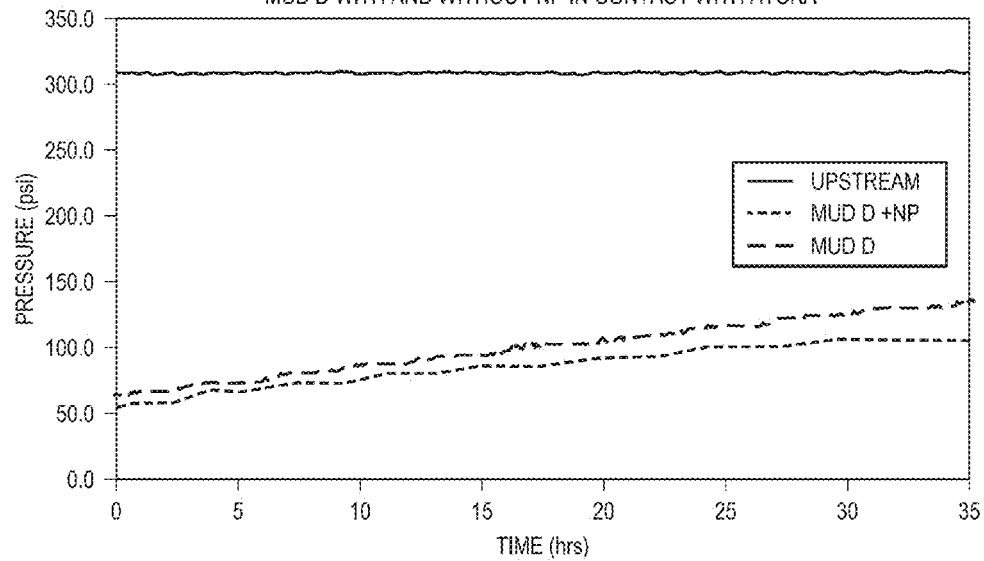
FIG. 21 is a graph that shows a comparison of Mud D with and without nanoparticles in contact with Atoka shale.

Another test was performed to observe the effect of NP's on the response of Mud D in contact with Atoka shale. Table 19 shows the test conditions and Table 20 shows the mud composition. The bottom pressure stabilized at 200 psi differential pressure in 30 hours. As shown in FIG. 21, adding Nyacol's silica NP dispersion to the Field Mud D reduced the fluid penetration by 25% in 36 hours. Using the transient method the permeability of the sample was determined to be 0.004 nd.

TABLE 19

Test Conditions.

| | |
|---|---|
| Shale | Atoka |
| Brand | Nyacol 9711 |
| Top Fluid | Mud D + NP |
| NP wt % | 10 |
| NP Size (nm) | 20 |
| Bottom Fluid | Brine |
| Aw top | 1 |
| Aw Bottom | 0.98 |
| Aw shale | 0.98 |
| Top Pres. (Psi) | 300 |
| Bottom Pres. (Psi) | 50 |
| Result | Stabilized at 200 psi differential pressure in 30 hours with a permeability of 0.0056 nd. |

TABLE 20

Composition.

| Mud D + Nyacol NP | Volume, cc | Mass, gr |
|---|---|---|
| Mud solid | 12.03 | 30.63 |
| mud water | 97.37 | 97.37 |
| mud total | 109.40 | 128.00 |
| NP solid | 10.13 | 16.80 |
| NP sol. water | 23.20 | 23.20 |
| NP sol. total | 33.33 | 40.00 |
| Total Solid % | 15.5% | 28.2% |
| NP % | 7.1% | 10.0% |

Figure 22:
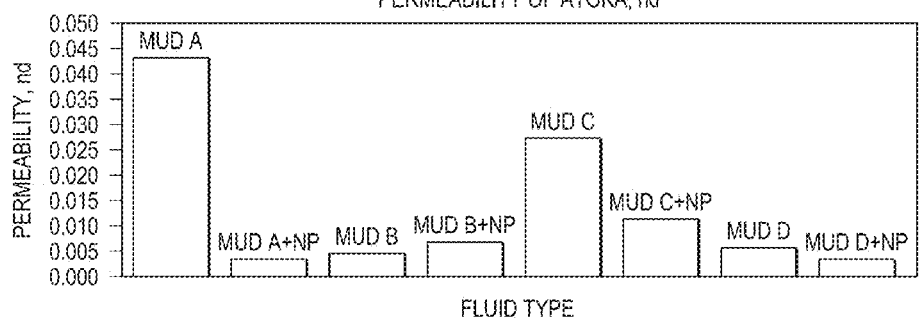
FIG. 22 is a graph that summarizes the permeability data.

Permeability calculations for each field mud test are done to observe the effect of nanoparticles. As seen in FIG. 22 and Table 21, nanoparticle additions to field muds reduced the permeability of Atoka shale by factor of 11 for Field Mud A, 2.45 for Field Mud C and 1.4 for Field Mud D.

TABLE 21

Permeability Values.

| Rock | Fluid | Permeability (nd) |
|---|---|---|
| Atoka | Brine | 0.41 |
| Atoka | Mud A | 0.044 |
| Atoka | Mud A Modified | 0.0038 |
| Atoka | Mud B | 0.0047 |
| Atoka | Mud B Modified | 0.0058 |
| Atoka | Mud C | 0.028 |
| Atoka | Mud C Modified | 0.0114 |
| Atoka | Mud D | 0.0056 |
| Atoka | Mud D Modified | 0.004 |

Example 5

Field Muds in Contact with GOM Shale

Tests were performed to observe the response of Mud A in contact with GOM shale. Table 22 shows the test conditions. The bottom pressure stabilized at 70 psi differential pressure in 20 hours. Using the transient method the permeability of the sample was determined to be 0.038 nd.

TABLE 22

Test conditions GOM shale.

| Shale | GOM |
|---|---|
| Top Fluid | Mud A |
| NP wt % | 0 |
| Bottom Fluid | Brine |
| Aw top | 1 |
| Aw Bottom | 0.98 |
| Aw shale | 0.98 |
| Top Pres. (Psi) | 300 |
| Bottom Pres. (Psi) | 70 |
| Result | Stabilized at 70 psi differential pressure in 20 hours with a permeability of 0.038 nd. |

Tests were performed to observe the effect of NP's on the response of Field Mud A in contact with GOM shale. Table 23 shows the test conditions and Table 24 shows the mud composition. The bottom pressure stabilized at 70 psi differential pressure in 20 hours. As shown in FIG. 23, adding Nyacol's silica NP dispersion to the Field Mud A reduced the fluid penetration by 27% in 36 hours. Using the transient method the permeability of the sample was determined to be 0.014 nd.

TABLE 23

Test Conditions.

| Shale | GOM |
|---|---|
| Brand | Nyacol 9711 |
| Top Fluid | Mud A + NP |
| NP wt % | 10 |
| NP Size (nm) | 20 |
| Bottom Fluid | Brine |
| Aw top | 1 |
| Aw Bottom | 0.98 |
| Aw shale | 0.98 |
| Top Pres. (Psi) | 315 |
| Bottom Pres. (Psi) | 40 |
| Result | Stabilized at 140 psi differential pressure in 24 hours with a permeability of 0.014 D. |

TABLE 24

Composition.

| Mud A + Nyacol NP | Volume, cc | Mass, gr |
|---|---|---|
| Mud solid | 17.33 | 56.44 |
| mud water | 71.56 | 71.56 |
| mud total | 88.89 | 128.00 |
| NP solid | 10.13 | 16.80 |
| NP sol. water | 23.20 | 23.20 |
| NP sol. total | 33.33 | 40.00 |
| Total Solid % | 22.5% | 43.6% |
| NP % | 8.3% | 10.0% |

Next, tests performed to observe the response of Mud B in contact with GOM shale. Table 25 shows the test conditions. The bottom pressure stabilized at 120 psi differential pressure in 11 hours. Using the transient method the permeability of the sample was determined to be 0.0404 nd.

TABLE 25

| Shale | GOM |
|---|---|
| Top Fluid | Mud B |
| NP wt % | 0 |
| Bottom Fluid | Brine |
| Aw top | 0.93 |
| Aw Bottom | 0.98 |
| Aw shale | 0.98 |
| Top Pres. (Psi) | 300 |
| Bottom Pres. (Psi) | 50 |
| Result | Stabilized at 120 psi differential pressure in 11 hours with a permeability of 0.0404 nd. |

A test was performed to observe the effect of NP's on the response of Mud B in contact with GOM shale. Table 26 shows the test conditions and Table 27 shows the mud composition. The bottom pressure stabilized at 150 psi differential pressure in 10 hours. Adding Nyacol's silica NP dispersion to the Field Mud B reduced the fluid penetration by 25% in 36 hours. Using the transient method the permeability of the sample was determined to be 0.0408 nd.

TABLE 26

Test Conditions.

| Shale | GOM |
|---|---|
| Brand | Nyacol 9711 |
| Top Fluid | Mud B + NP |
| NP wt % | 10 |
| NP Size (nm) | 20 |
| Bottom Fluid | Brine |
| Aw top | 0.93 |
| Aw Bottom | 0.98 |
| Aw shale | 0.98 |
| Top Pres. (Psi) | 310 |
| Bottom Pres. (Psi) | 50 |
| Result | Stabilized at 160 psi differential pressure in 10 hours with a permeability of 0.0408 nd. |

TABLE 27

Composition.

| Mud B + Nyacol NP | Volume, cc | Weight, gr |
|---|---|---|
| Mud solid | 17.94 | 48.97 |
| mud water | 79.03 | 79.03 |
| mud total | 96.97 | 128.00 |
| NP solid | 10.13 | 16.80 |
| NP sol. water | 23.20 | 23.20 |
| NP sol. total | 33.33 | 40.00 |
| Total Solid % | 21.5% | 39.1% |
| NP % | 7.8% | 10.0% |

A test was performed to observe the response of Mud C in contact with GOM shale. Table 28 shows the test conditions. The bottom pressure stabilized at 100 psi differential pressure in 27 hours. Using the transient method the permeability of the sample was determined to be 0.0203 nd.

TABLE 28

Test Conditions.

| Shale | GOM |
|---|---|
| Top Fluid | Mud C |
| NP wt % | 0 |
| Bottom Fluid | Brine |
| Aw top | 0.98 |
| Aw Bottom | 0.98 |
| Aw shale | 0.98 |
| Top Pres. (Psi) | 300 |
| Bottom Pres. (Psi) | 50 |
| Result | Stabilized at 100 psi differential pressure in 27 hours with a permeability of 0.0203 nd. |

Figure 25:
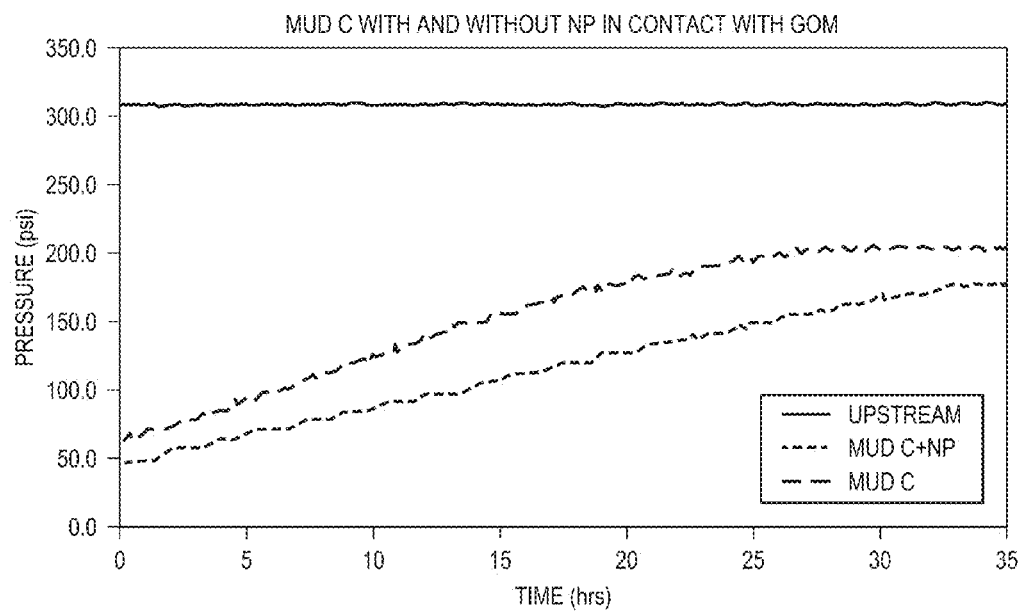
FIG. 25 is a graph that shows a comparison of Mud C with and without NP in contact with GOM shale.

Next, a test was performed to observe the effect of NP's on the response of Mud C in contact with GOM shale. Table 29 shows the test conditions and Table 30 shows the mud composition. The bottom pressure stabilized at 120 psi differential pressure in 35 hours. As shown in FIG. 25, adding Nyacol's silica NP dispersion to the Field Mud C reduced the fluid penetration by 20% in 36 hours. Using the transient method the permeability of the sample was determined to be 0.0126 nd.

TABLE 29

Test Conditions.

| | |
|---|---|
| Shale | GOM |
| Brand | Nyacol 9711 |
| Top Fluid | Mud C+ NP |
| NP wt % | 10 |
| NP Size (nm) | 20 |
| Bottom Fluid | Brine |
| Aw top | 0.98 |
| Aw Bottom | 0.98 |
| Aw shale | 0.98 |
| Top Pres. (Psi) | 295 |
| Bottom Pres. (Psi) | 50 |
| Result | Stabilized at 120 psi differential pressure in 36 hours with a permeability of 0.0126 nd. |

TABLE 30

Composition.

| Mud C + Nyacol NP | Volume, cc | Mass, gr |
|---|---|---|
| Mud solid | 21.14 | 34.86 |
| mud water | 93.14 | 93.14 |
| mud total | 114.29 | 128.00 |
| NP solid | 10.13 | 16.80 |
| NP sol. water | 23.20 | 23.20 |
| NP sol. total | 33.33 | 40.00 |
| Total Solid % | 21.2% | 30.7% |
| NP % | 6.9% | 10.0% |

Tests were performed to observe the response of Mud D in contact with GOM shale. Table 31 shows the test conditions. The bottom pressure kept the differential pressure at 150 psi for 35 hours. Using the transient method the permeability of the sample was determined to be 0.0109 nd.

TABLE 31

Test Conditions.

| | |
|---|---|
| Shale | GOM |
| Top Fluid | Mud D |
| NP wt % | 0 |
| Bottom Fluid | Brine |
| Aw top | 1 |
| Aw Bottom | 0.98 |
| Aw shale | 0.98 |
| Top Pres. (Psi) | 340 |
| Bottom Pres. (Psi) | 50 |
| Result | Kept the differential pressure at 140 psi for 36 hours with a permeability of 0.0109 nd. |

Figure 26:
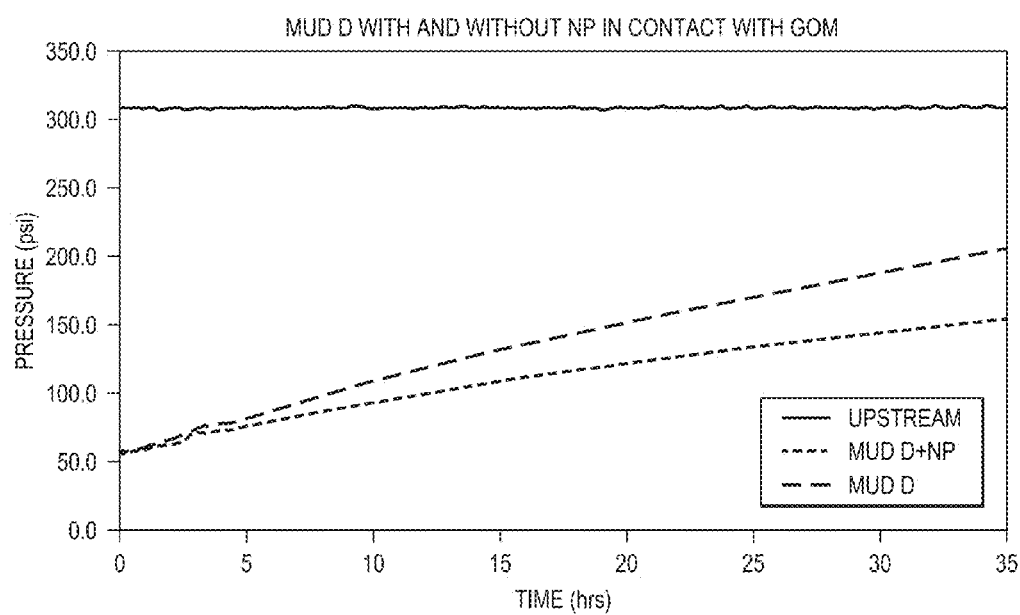
FIG. 26 is a graph that shows a comparison of Mud D with and without NP in contact with GOM shale.

A test was also performed to observe the effect of NP's on the response of Mud D in contact with GOM shale. Table 32 shows the test conditions and Table 33 shows the mud composition used for the test. The bottom pressure stabilized at 170 psi differential pressure in 36 hours. As shown in FIG. 26, adding Nyacol's silica NP dispersion to the Field Mud D reduced the fluid penetration by 17% in 36 hours. Using the transient method the permeability of the sample was determined to be 0.007 nd.

TABLE 32

Test Conditions.

| | |
|---|---|
| Shale | GOM |
| Brand | Nyacol 9711 |
| Top Fluid | Mud D + NP |
| NP wt % | 10 |
| NP Size (nm) | 20 |
| Bottom Fluid | Brine |
| Aw top | 1 |
| Aw Bottom | 0.98 |
| Aw shale | 0.98 |
| Top Pres. (Psi) | 310 |
| Bottom Pres. (Psi) | 50 |
| Result | Stabilized at 170 psi differential pressure in 36 hours with a permeability of 0.0070 nd. |

TABLE 33

Composition.

| Mud D + Nyacol NP | Volume, cc | Mass, gr |
|---|---|---|
| Mud solid | 12.03 | 30.63 |
| mud water | 97.37 | 97.37 |
| mud total | 109.40 | 128.00 |
| NP solid | 10.13 | 16.80 |
| NP sol. water | 23.20 | 23.20 |
| NP sol. total | 33.33 | 40.00 |
| Total Solid % | 15.5% | 28.2% |
| NP % | 7.1% | 10.0% |

Figure 27:
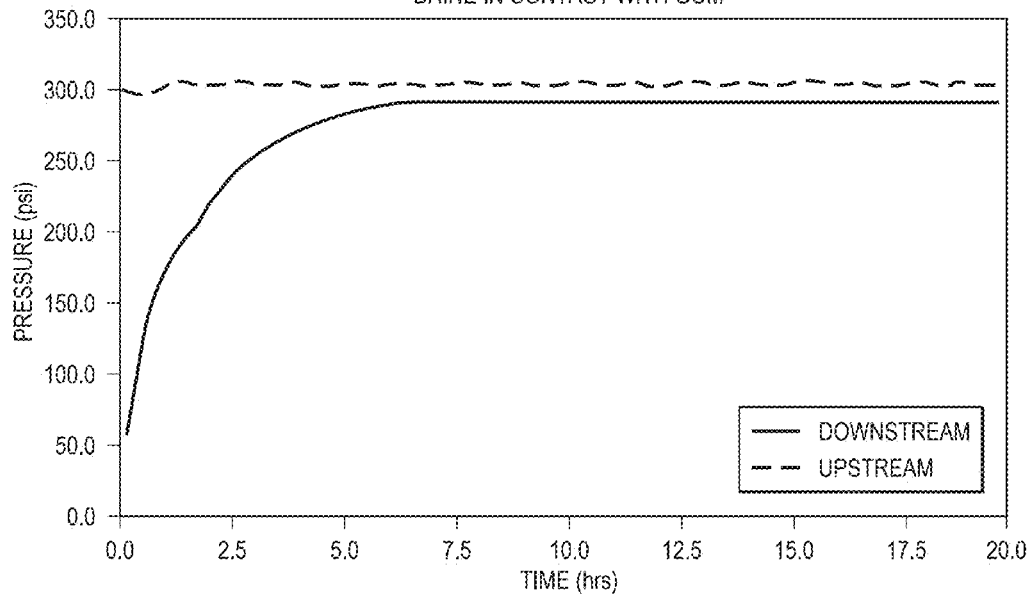
FIG. 27 is a graph that shows effect of brine on GOM shale.

Tests were also performed to observe the response brine in contact with GOM shale. Table 34 shows the test conditions. As seen in FIG. 27, the bottom pressure built up to the top pressure in 5 hours. Using the transient method the permeability of the sample was determined to be 0.6510 nd.

TABLE 34

Test Conditions.

| | |
|---|---|
| Shale | GOM |
| Top Fluid | Brine |
| NP wt % | 0 |
| Bottom Fluid | Brine |
| Aw top | 0.98 |
| Aw Bottom | 0.98 |
| Aw shale | 0.98 |
| Top Pres. (Psi) | 300 |
| Bottom Pres. (Psi) | 50 |
| Result | Built up to the top pressure in 5 hours with a permeability of 0.6510 nd. |

Figure 28:
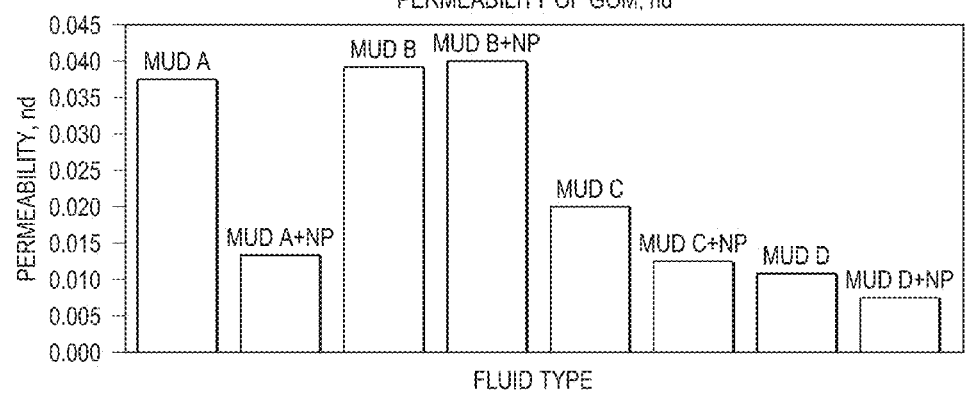
FIG. 28 is a graph that summarizes the permeability chart of GOM shale.

Permeability calculations for each field mud test were done to observe the effect of nanoparticles. As seen in FIG. 28 and Table 35, nanoparticle additions to the field muds reduced the permeability of GOM shale by factor of 2.76 for Field Mud A, 1.61 for Field Mud C and 1.55 for Field Mud D.

TABLE 35

Comparison of permeability calculations of test on GOM shale.

| Rock | Fluid | Permeability (nd) |
|---|---|---|
| GOM | Brine | 0.6510 |
| GOM | Mud A | 0.0380 |
| GOM | Mud A Modified | 0.0140 |
| GOM | Mud B | 0.0404 |
| GOM | Mud B Modified | 0.0408 |
| GOM | Mud C | 0.0203 |
| GOM | Mud C Modified | 0.0126 |
| GOM | Mud D | 0.0109 |
| GOM | Mud D Modified | 0.0070 |

Example 6

Lab Muds Test Results

Figure 29:
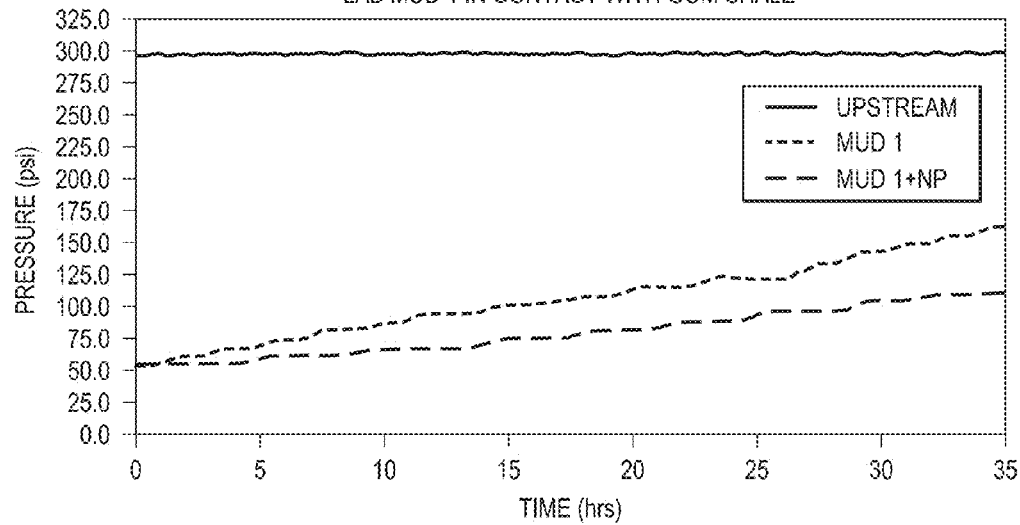
FIG. 29 is a graph that shows a comparison of Mud 1 with and without NP in contact with GOM Shale.

Lab Muds were tested. Fluid penetration reduction is calculated by using initial and final hydraulic differential pressures. Permeability calculations were performed using the method stated in SPE paper No. 116306 by Collins E. Osuji. Each test performed used a new sample of GOM shale. All tests were performed at ambient temperature. Only Nycol's silica 20 nm particles (NPs) were used. All tests used new samples of GOM shale. In this example, lab Mud 1 was studied in order to observe the response of Mud 1 when in contact with GOM shale. As shown in FIG. 29, Mud 1 (thin line) stabilized at 135 psi differential pressure (300–165) after 35 hours. Another test was performed in order to observe the effect of adding NP's to Mud 1. As shown in FIG. 29, the bottom pressure (thick line) stabilized at 180 psi differential pressure (300–120) in 35 hours. Adding 10 wt % of Nyacol's 20 nm silica NP to Lab Mud 1 reduced the fluid penetration by 41% in 35 hours. The final permeabilities of the samples were determined to be 0.0209 nd and 0.0104 nd for Mud 1 and Mud 1+NP respectively.

Figure 30:
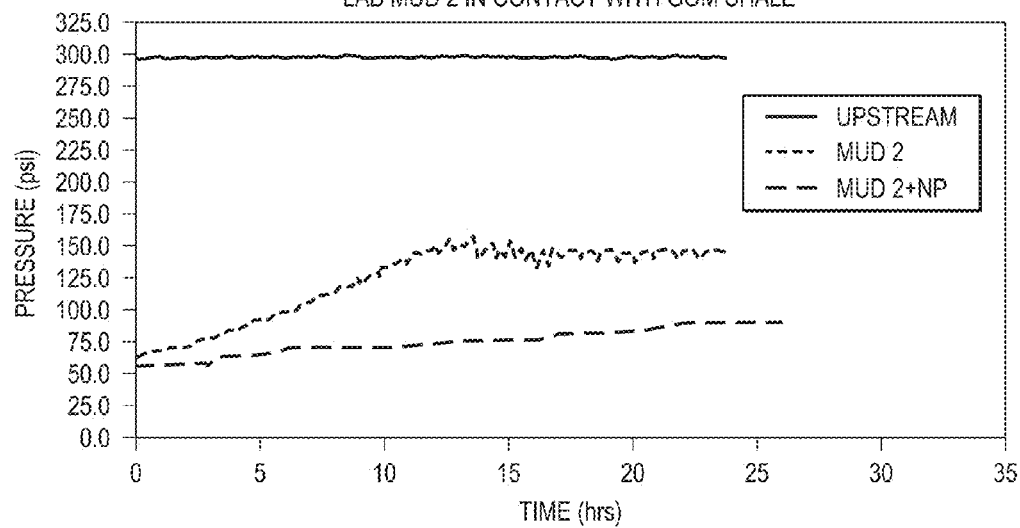
FIG. 30 is a graph that shows a comparison of Mud 2 with and without NP in contact with GOM Shale.

Another test was performed in order to observe the response of Mud 2 when in contact with GOM shale. As shown in FIG. 30, Mud 2 (thin line) stabilized at 150 psi differential pressure (300–150) after 14 hours. Test 4 was performed in order to observe the effect of adding NP's to Mud 2. As shown in FIG. 30, the bottom pressure (thick line) stabilized at 210 psi differential pressure (300–90) in 22 hours. Adding 10 wt % of Nyacol's 20 nm silica NP to Lab Mud 2 reduced the fluid penetration by 57% in 23 hours. The final permeabilities of the samples were determined to be 0.042 nd and 0.0066 nd for Mud 2 and Mud 2+NP respectively.

Figure 31:
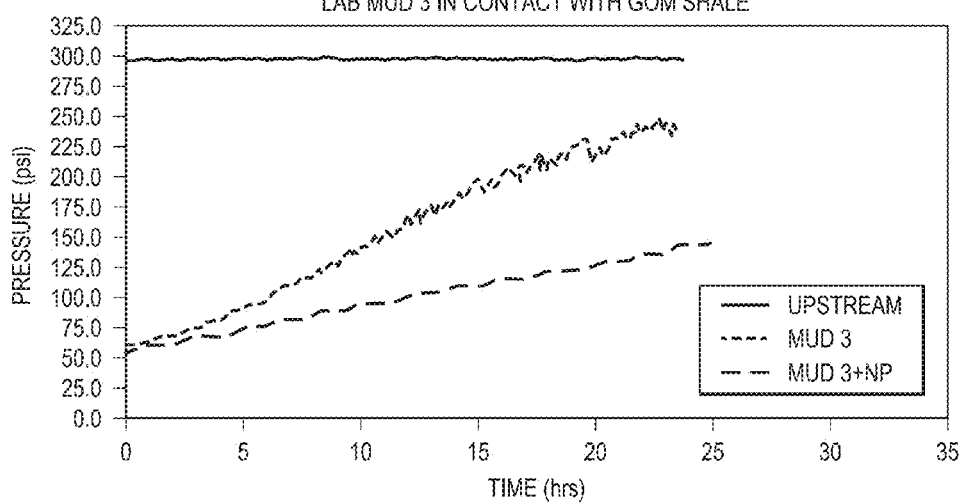
FIG. 31 is a graph that shows a comparison of Mud 3 with and without NP in contact with GOM shale.

Another test was performed in order to observe the response of Mud 2 when in contact with GOM shale. As shown in FIG. 31, Mud 3 (thin line) stabilized at 55 psi differential pressure (300–245) after 25 hours. Test 6 was performed in order to observe the effect of adding NP's to Mud 3. As shown in FIG. 31, the bottom pressure (thick line) stabilized at 155 psi differential pressure (300–145) in 25 hours. Adding 10 wt % of Nyacol's 20 nm silica NP to Lab Mud 3 reduced the fluid penetration by 50% in 23 hours. The final permeabilities of the samples were determined to be 0.086 nd and 0.0243 nd for Mud 3 and Mud 3+NP respectively.

It is contemplated that any embodiment discussed in this specification can be implemented with respect to any method, kit, reagent, or composition of the invention, and vice versa.

Furthermore, compositions of the invention can be used to achieve methods of the invention. Many types of nanoparticles (1 to 500 nm size range) can be used to achieve the plugging described above. The size of the nanoparticles can be tailored to meet the pore sizes in different shales.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention.

All such similar substitutes and modifications apparent to those skilled in the art are deemed to be within the spirit, scope and concept of the invention as defined by the appended claims.

REFERENCES

Abrams A., "Mud design to minimize rock impairment due to particle invasion", JPT (May 1977) pg. 586
Chenevert, M. E., "Shale control with balanced activity oil continuous muds", SPE AIME, 1969
Dewan J. T., Chenevert M. E., "A model for filtration of water based mud during drilling: Determination of mudcake parameters", The University of Texas at Austin, 2001
Osuji, C., "Effect of porosity and permeability on the membrane efficiency of shales", UT Annual Drilling Meeting, 2007.
Talal M. Al-Bazali "Experimental study of the membrane behavior of shale during interaction with water-based and oil-based muds", The University of Texas at Austin, (May 2005)
www.azonano.com.
SPE paper No. 116306 by Collins E. Osuji

What is claimed is:

1. A method of increasing shale formation stability with a water-based drilling fluid, the method comprising the steps of:
   identifying a shale formation, wherein the shale comprises Pierre, Arco China, C1, C2, C3, C4, C5, Atoka, Gumbo, Pierre, Wolfcamp, Wellington or Mancos;
   delivering a water-based nanoparticle drilling fluid to the shale formation, wherein the drilling fluid comprises:
   an aqueous continuous phase; and
   one or more nanoparticles, wherein the one or more nanoparticles comprise between about 5 and about 45 weight percent nanoparticles in a size range of between about 5 and 500 nanometer and are present in a sufficient weight percent to stabilize the shale formation.

2. The method of claim 1, wherein the nanoparticles are selected from silica, aluminum, iron, titanium or other metal oxides and hydroxides.

3. The method of claim 1, wherein the nanoparticles comprise a size range of between 10 and 32 nanometers.

4. The method of claim 1, wherein the nanoparticles are provided into a wellbore in the form of a slug of nanoparticles in a drilling mud.

5. The method of claim 1, wherein the nanoparticles further comprise a surface active agent.

6. An additive composition for aqueous drilling fluids which imparts improved stability when used in drilling shale formations comprising:
   an aqueous phase comprising an effective quantity of one or more nanoparticles comprising a size range of between 5 and 500 nanometer and adapted for use in a hydrocarbon bearing shale formation selected from Pierre, Arco China, C1, C2, C3, C4, C5, Atoka, Gumbo, Pierre, Wolfcamp, Wellington or Mancos, wherein the one or more nanoparticles are between about 5 and about 45 weight percent nanoparticles and are selected from silica, aluminum, iron, titanium or other metal oxides and hydroxides wherein the nanoparticles decrease swelling and plug pore throats.

7. The method of claim 1, wherein the shale comprises Pierre, Arco China, C1, C3, C5, or Atoka.

8. The aqueous well-drilling fluid containing between about 1 and about 41 weight percent, based on the weight of the aqueous phase, of the additive composition of claim 6.

9. The additive of claim 6, wherein the nanoparticles further comprise one or more surface modifications.

10. An aqueous well-drilling fluid for hydrocarbon bearing shale formation selected from Pierre, Arco China, C1, C2, C3, C4, C5, Atoka, Gumbo, Pierre, Wolfcamp, Wellington or Mancos containing between about 1 and about 50 weight percent of a silica nanoparticles, wherein the nanoparticles are selected from silica, aluminum, iron, titanium or other metal oxides and hydroxides and the silica nanoparticles comprise between about 5 and about 45 weight percent nanoparticles in a size range of between a 5 and a 500 nanometer range and are adapted for use in shale selected from Pierre, Arco China, C1, C2, C3, C4, C5, Atoka, Gumbo, Pierre, Wolfcamp, Wellington or Mancos.

11. An aqueous well-drilling fluid containing
   an aqueous well-drilling fluid adapted for use in shale selected from Pierre, Arco China, C1, C2, C3, C4, C5, Atoka, Gumbo, Pierre, Wolfcamp, Wellington or Mancos;
   wherein the aqueous well-drilling fluid comprises an aqueous phase and between about 5 and about 45 weight percent silica nanoparticles with a particle size of between 5 and 500 nm.

12. The fluid of claim 11, wherein the fluid comprises between 10 and about 29 weight percent silica nanoparticles, based on the weight of the aqueous phase.

13. The fluid of claim 11, wherein the nanoparticles further comprise one or more surface modifications.

14. The method for drilling effectively through unconsolidated shales which comprises using the aqueous drilling fluid of claim 11 in the drilling operation.

15. A method of increasing shale formation stability with a water-based drilling fluid, the method comprising:
   identifying a shale formation selected from Pierre, Arco China, C1, C2, C3, C4, C5, Atoka, Gumbo, Pierre, Wolfcamp, Wellington or Mancos;
   delivering the water-based drilling fluid to the shale formation, wherein the drilling fluid comprises an aqueous continuous phase and a slug of nanoparticles between about 5 and about 45 weight percent nanoparticles and with a particle size of between 10 and 500 nm, wherein the nanoparticles are present in a sufficient weight percent to stabilize the shale formation.

16. The method of claim 15, wherein the nanoparticles comprise from 5 to 40 weight percent nanoparticles in a drilling mud.

17. A method of increasing shale formation stability with a water-based drilling fluid, the method comprising the steps of:
   identifying a shale formation, wherein the shale comprises C1, C2, C3, C4, or C5;
   delivering the water-based drilling fluid to the shale formation, wherein the drilling fluid comprises
   an aqueous continuous phase; and
   nanoparticles, wherein the nanoparticles have a particle size of between 5 and 500 nm and are present in a sufficient weight of between 0.05 and 25 weight percent to stabilize the shale formation.

18. A method of increasing shale formation stability with a water-based drilling fluid, the method comprising the steps of:
   identifying a shale formation, wherein the shale comprises Pierre, Arco China, Atoka, Pierre, Wolfcamp, Wellington or Mancos;

delivering the water-based drilling fluid to the shale formation, wherein the drilling fluid comprises an aqueous continuous phase; and one or more nanoparticles have a particle size of between 5 and 500 nm, wherein the nanoparticles are present in a sufficient weight percent of between 0.05 and 25 weight percent to stabilize the shale formation.

19. The method of claim 18, wherein the shale comprises Pierre, Arco China, or Atoka.

20. A method of increasing shale formation stability with a water-based drilling fluid, the method comprising the steps of:

identifying a shale formation, wherein the shale comprises Gumbo;

delivering the water-based drilling fluid to the shale formation, wherein the drilling fluid comprises an aqueous continuous phase; and nanoparticles, wherein the nanoparticles are present in a sufficient weight percent of between 0.05 and 25 to stabilize the shale formation.

* * * * *